(12) United States Patent
Takahashi et al.

(10) Patent No.: US 8,905,550 B2
(45) Date of Patent: Dec. 9, 2014

(54) PROJECTION OPTICAL SYSTEM AND IMAGE PROJECTION DEVICE

(75) Inventors: Tatsuya Takahashi, Kanagawa (JP); Kazuhiro Fujita, Tokyo (JP); Issei Abe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 154 days.

(21) Appl. No.: 13/643,177

(22) PCT Filed: May 9, 2011

(86) PCT No.: PCT/JP2011/061116
§ 371 (c)(1),
(2), (4) Date: Oct. 24, 2012

(87) PCT Pub. No.: WO2011/145535
PCT Pub. Date: Nov. 24, 2011

(65) Prior Publication Data
US 2013/0235356 A1    Sep. 12, 2013

(30) Foreign Application Priority Data

May 18, 2010  (JP) ................................. 2010-114662

(51) Int. Cl.
*G03B 21/28* (2006.01)
*G02B 17/08* (2006.01)
*G03B 21/14* (2006.01)

(52) U.S. Cl.
CPC ............ *G02B 17/08* (2013.01); *G02B 17/0852* (2013.01); *G03B 21/28* (2013.01); *G03B 21/14* (2013.01)
USPC .............................................. 353/78; 353/99

(58) Field of Classification Search
CPC ............... H04N 9/3147; G06F 3/1146; G09G 2300/026; G03B 21/147; G03B 21/28
USPC ................... 353/69, 70, 74, 77, 78, 79, 98, 99
See application file for complete search history.

(56) References Cited

U.S. PATENT DOCUMENTS 7,048,388 B2 * 5/2006 Takaura et al. ................. 353/99
7,637,618 B2 * 12/2009 Takaura et al. ................. 353/37
(Continued)

FOREIGN PATENT DOCUMENTS

EP        0 655 636 A1    5/1995
EP        1 806 612 A1    7/2007
(Continued)

OTHER PUBLICATIONS

International Search Report Issued Aug. 2, 2011 in PCT/ JP11/61116 Filed May 9, 2011.

(Continued)

*Primary Examiner* — William C Dowling
(74) *Attorney, Agent, or Firm* — Oblon, Spivak, McClelland, Maier & Neustadt, L.L.P.

(57) ABSTRACT

A disclosed projection optical system projects images on a surface to be projected on. The projection optical system includes a first optical system including at least one refraction optical system and having positive power as a whole, a folding mirror, and a second optical system including at least one reflection surface having power and having positive power as a whole. Further the folding mirror folds a light path from the first optical system to the second optical system, and in a plane including an optical axis of the first optical system and a normal line of the surface to be projected on, the following conditional expressions (1) through (3) are satisfied (1) $0.43 \leq d_1$, (2) $0.43 \leq d_2$, and (3) $0.7 \leq d_2/d_1 \leq 2.0$.

9 Claims, 17 Drawing Sheets

(56) References Cited

U.S. PATENT DOCUMENTS

| | | | |
|---|---|---|---|
| 7,637,621 B2* | 12/2009 | Takaura et al. | 353/99 |
| 7,946,717 B2* | 5/2011 | Abe et al. | 353/99 |
| 8,254,039 B2* | 8/2012 | Fujita et al. | 359/727 |
| 8,511,837 B2* | 8/2013 | Takahashi et al. | 353/98 |
| 2004/0156117 A1 | 8/2004 | Takaura et al. | |
| 2006/0126032 A1 | 6/2006 | Takaura et al. | |
| 2007/0035670 A1* | 2/2007 | Prior et al. | 348/745 |
| 2008/0068563 A1 | 3/2008 | Abe et al. | |
| 2008/0068564 A1* | 3/2008 | Abe et al. | 353/98 |
| 2008/0304019 A1 | 12/2008 | Takaura et al. | |
| 2009/0015801 A1 | 1/2009 | Takaura et al. | |
| 2009/0015910 A1 | 1/2009 | Takaura et al. | |
| 2009/0021703 A1 | 1/2009 | Takaura et al. | |
| 2009/0122279 A1* | 5/2009 | Minefuji | 353/99 |
| 2010/0039625 A1 | 2/2010 | Takaura et al. | |
| 2010/0097581 A1 | 4/2010 | Yamada et al. | |
| 2011/0038039 A1 | 2/2011 | Takaura et al. | |
| 2012/0019791 A1* | 1/2012 | Abe et al. | 353/99 |

FOREIGN PATENT DOCUMENTS

| | | |
|---|---|---|
| JP | 2004 258620 | 9/2004 |
| JP | 2008 96983 | 4/2008 |
| JP | 2008 96984 | 4/2008 |
| JP | 2008 242025 | 10/2008 |
| JP | 2008 242028 | 10/2008 |

OTHER PUBLICATIONS

Extended European Search Report, issued May 19, 2014, in Patent Application No. 11783469.7, pp. 1-7.

* cited by examiner

PROJECTION OPTICAL SYSTEM AND IMAGE PROJECTION DEVICE

TECHNICAL FIELD

The present invention relates to a projection optical system and an image projection device.

BACKGROUND ART

Recently, in liquid crystal projectors widely known as image projection devices, some developments have been made such as higher resolution of the liquid crystal panels, brighter projection images along with higher efficiency light source lamps, and reduction of the costs. Further, small and light-weight image projection devices using the DMD (Digital Micro-mirror Device) have been widely used. As result, not only in offices and schools but also in homes, the image projection devices have started to be used. Especially, with the improvement of the portability, font-type projectors have been used in small conference rooms for limited numbers of people.

Ultra short-focus projectors have an advantage that the shadow of a presenter is not projected on the screen. On the other hand, when the projection distance is less than the total length of the optical system, it may not be possible to use the optical system by installing the optical system separated from the surface to be projected on. In such a case, the optical system may have to be buried behind (into) the surface to be projected on.

DISCLOSURE OF THE INVENTION

Problems to be Solved by the Invention

With regard to conventional projection optical systems and the image projection devices including the conventional projection optical systems, for example, Patent Document 1 discloses a configuration in which a folding mirror is disposed between a first optical system and a second optical system. However, in the projection optical system disclosed in Patent Document 1 and in the image projection device including the projection optical system, depending on the conditions, the light reflected by the folding mirror may be blocked (cut) by the first optical system or the light reflected by the second optical system may be blocked by the folding mirror.

Patent Document 1: Japanese Patent Application Publication No.: 2008-096983

The present invention is made in light of the above environments, and may provide a projection optical system capable of resolving the problem where light is blocked and projecting without being buried behind the surface to be projected on.

Means for Solving the Problems

According to an aspect of the present invention, a projection optical system projecting images on a surface to be projected on, the projection optical system including a first optical system including at least one refraction optical system and having positive power as a whole; a folding mirror; and a second optical system including at least one reflection surface having power and having positive power as a whole. Further the folding mirror folds a light path from the first optical system to the second optical system, in a plane including an optical axis of the first optical system and a normal line of the surface to be projected on, and the following conditional expressions (1) through (3) are satisfied $$0.43 \leq d_1; \tag{1}$$

$$0.43 \leq d_2; \text{ and} \tag{2}$$

$$0.7 \leq d_2/d_1 \leq 2.0. \tag{3}$$

Further, $d_1$ is expressed in the following equation (1)

$$d_1 = \frac{l_1}{f \cos\theta_3} \sin(2\theta_2 - \theta_1 - \theta_3) \tag{1}$$

where
a symbol f denotes a focal length of the first optical system;
a symbol $d_1$ denotes a value obtained by dividing a distance by the focal length f of the first optical system, the distance being between a light and a point in a normal direction from the light, the light having been reflected by the folding mirror at a position closest to an outer end closer to the first optical system of outer ends of the folding mirror, the point being the intersection of a surface in the first optical system and the optical axis of the first optical system, the surface being the closest to the light;
a symbol $d_2$ denotes a value obtained by dividing a distance by the focal length f of the first optical system, the distance being in a normal direction from the optical axis of the first optical system and being between a light and an outer end of the folding mirror, the outer end being farther from the first optical system of the outer ends of the folding mirror, the light having been reflected by the second optical system and being closest to the outer end which is farther from the first optical system of the outer ends of the folding mirror;
a symbol $l_1$ denotes a distance in the optical axis direction of the first optical system and between a surface in the first optical system and the outer end of the folding mirror, the surface being closest to the folding mirror, the outer end being closer to the first optical system of the outer ends of the folding mirror;
a symbol $\theta_1$ denotes an emission angle of light relative to the optical axis direction, the light being to be reflected by the folding mirror at a position closest to the outer end closer to the first optical system of the outer ends of the folding mirror and being emitted from the surface closest to the folding mirror, the surface being included in the first optical system;
a symbol $\theta_2$ denotes an angle of the folding mirror relative to a normal direction of the optical axis; and
a symbol $\theta_3$ denotes an angle of a line relative to the optical axis direction, the line connecting between an outer end and a point, the outer end being closer to the first optical system of the outer ends of the folding mirror, the point being the intersection of the surface in the first optical system and the optical axis of the first optical system, the surface being the closest to the folding mirror.

Effects of the Present Invention

According to the disclosed technique, it may become possible to provide a projection optical system capable of resolving the problem where light is blocked and projecting without being buried into the surface to be projected on.

Figure 1:
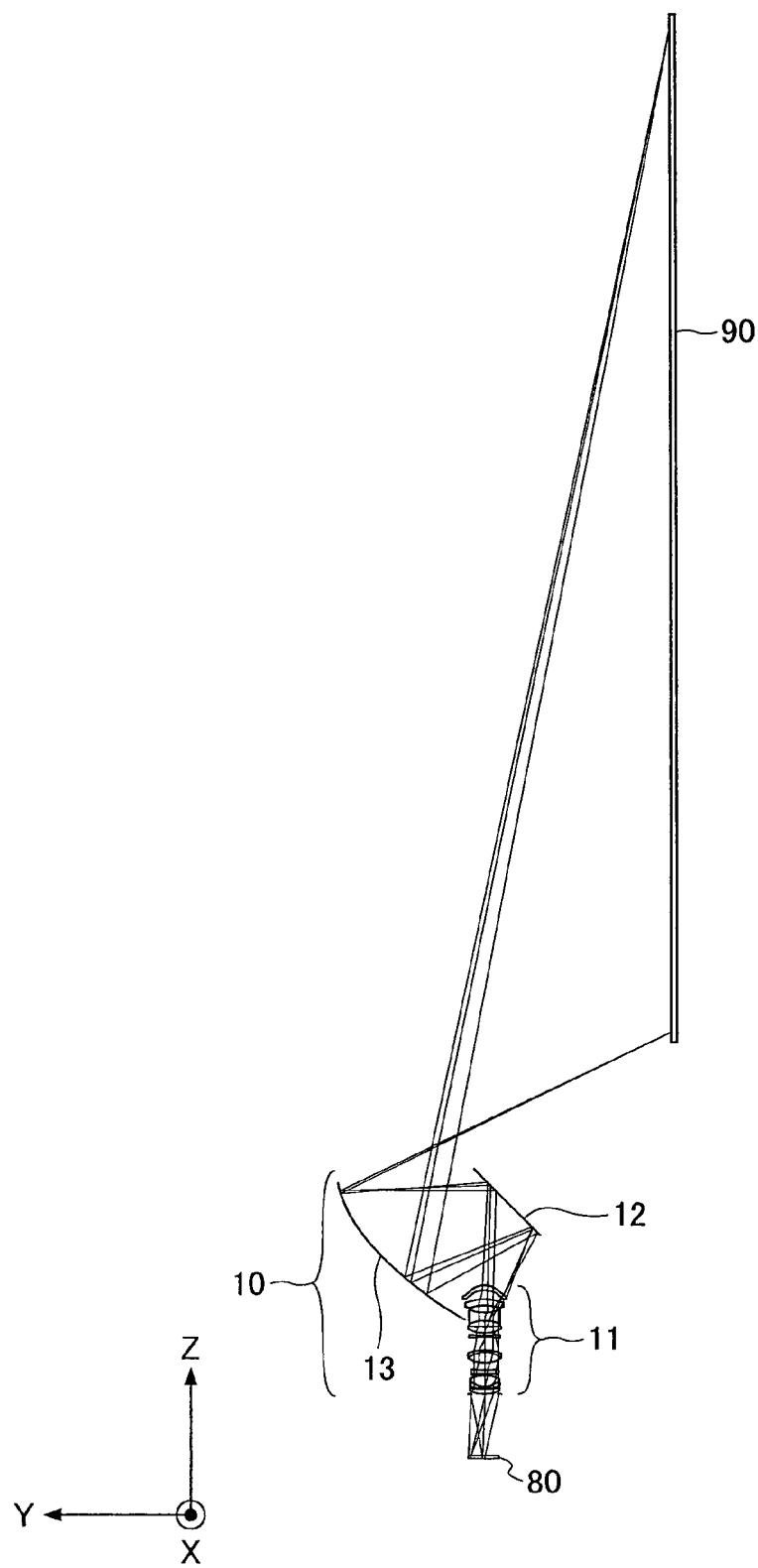
FIG. 1 is a ray diagram illustrating a projection optical system according to a first embodiment of the present invention.

DESCRIPTION OF THE REFERENCE NUMERALS 10, 10A, 10B, 20: PROJECTION OPTICAL SYSTEM
11: FIRST OPTICAL SYSTEM
12: FOLDING MIRROR
12A, 12B: OUTER END
13: SECOND OPTICAL SYSTEM
50: IMAGE PROJECTION DEVICE
60: LIGHTING OPTICAL SYSTEM
61: LIGHT SOURCE
62: REFLECTOR
63, 64: RELAY LENS
65: LUMINANCE UNIFORMING UNIT
66: COLOR WHEEL
70: SEPARATING UNIT
80: IMAGE FORMING ELEMENT
90: SCREEN
91, 92: AUXILIARY LINE
95, 97, 98: LIGHT
96: POINT
$D_1, D_2, D_3, l_1, l_2$: DISTANCE
$\theta_1, \theta_2, \theta_3, \theta_{14}$: ANGLE
$\phi_1$: DIAMETER

BEST MODE FOR CARRYING OUT THE INVENTION

In the following, embodiments of the present invention are described with reference to the accompanying drawings. In the figures, the same reference numerals are used for the same or equivalent elements, and repeated description thereof may be omitted.

First Embodiment

Figure 2:
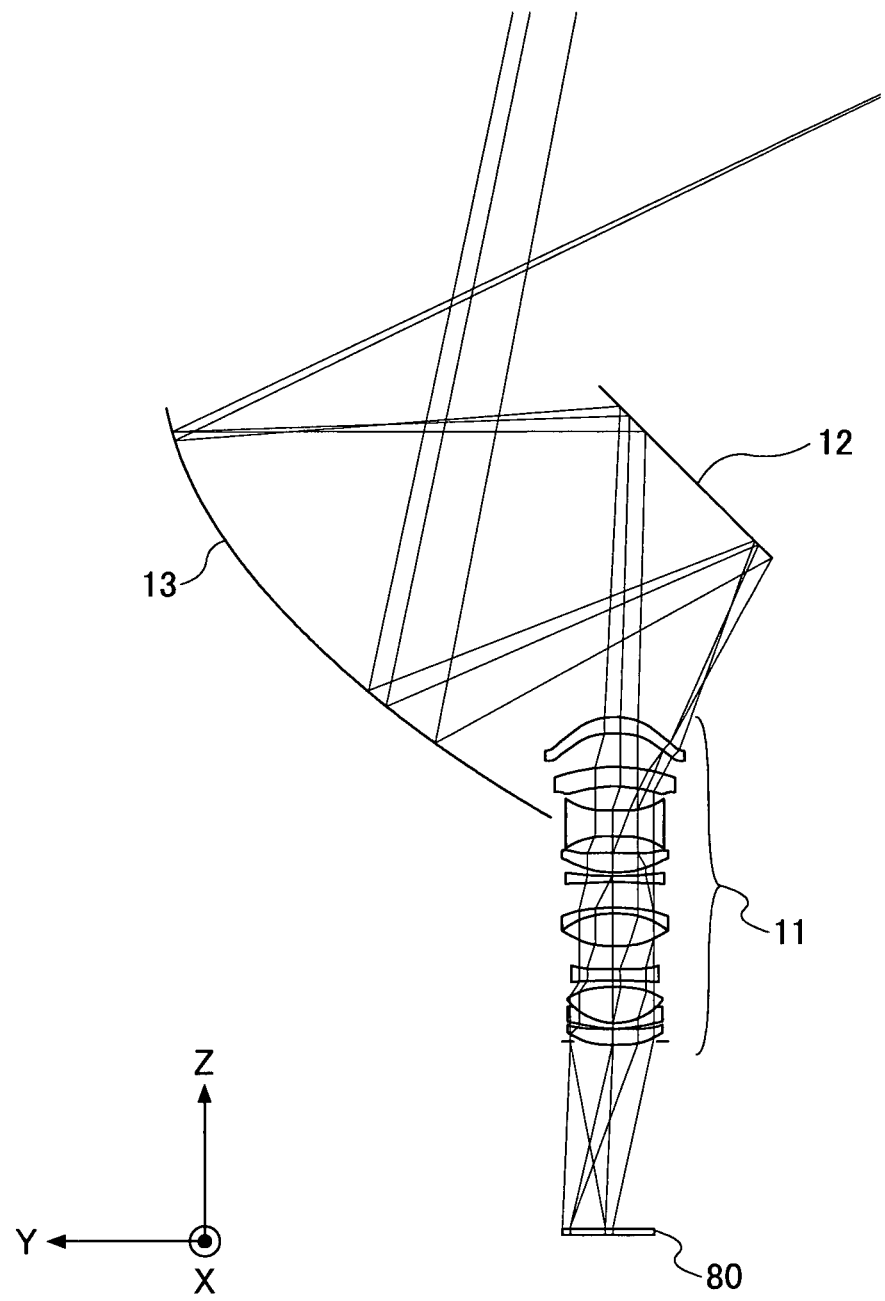
FIG. 2 is a partially enlarged ray diagram of FIG. 1.

FIG. 1 is a ray diagram illustrating a projection optical system according to a first embodiment of the present invention. FIG. 2 is a partially enlarged ray diagram of FIG. 1. In the coordinate system in FIGS. 1 and 2, a symbol X denotes the long axis direction of the screen, a symbol Z denotes the short axis direction of the screen, and a symbol Y denotes the normal direction of the screen. Referring to FIGS. 1 and 2, a projection optical system 10 includes a first optical system 11, a folding mirror 12, and a second optical system 13. Further, a reference numeral 80 denotes an image forming element (hereinafter referred to as an image forming element 80), and a reference numeral 90 denotes a screen (hereinafter referred to as a screen 90).

In the projection optical system 10, the first optical system 11 is a coaxial optical system including at least one refraction optical system (i.e., lens) and has positive power as a whole. The folding mirror 12 is a mirror folding (changing) the path (direction) of the light traveling from the first optical system 11 to the second optical system 13. The second optical system includes at least one reflection surface having power and has positive power as a whole. Further, in this embodiment, a case is described where the first optical system 11 includes eleven lenses. However, the present invention is not limited to this configuration.

Light fluxes emitted from the image forming element 80 which is a light valve such as a liquid crystal panel are incident into the first optical system 11 of the projection optical system 10, folded by the folding mirror 12 after passing through the first optical system 11, and then reflected by the second optical system 13 to be projected on the screen 90. An image formed by the image forming element 80 is formed as an intermediate image on the light path of the first optical system 11 and the second optical system 13, and an image generated by enlarging the intermediate image is projected and formed on the screen 90.

Light near the optical axis forms the intermediate image between the folding mirror 12 and the second optical system 13, and light far from the optical axis forms the intermediate image between the first optical system 11 and the folding mirror 12. By folding the light path using the folding mirror 12, it may become possible to convert the projection direction from the direction parallel to the depth direction to the direction parallel to the height direction even when the projection distance of the optical system is less than the total length of the optical system. Because of this feature, it may become possible to project an image without burying the optical system into the screen. This feature may be apparent when comparing the direction of the first optical system in FIG. 1 and the direction of the first optical system in FIG. 4.

Further, the projection distance may be reduced. Because of this feature, it may become possible to use even in a narrow conference room or the like. Further, as another effect, unlike a conventional projector, it may become possible to alleviate the problem that the shadow of a presenter is projected on the screen when the presenter is between the projector and the screen. Further, by using an aspherical lens as a part of lenses included in the first optical system 1, the degree of freedom of design may be expanded and imaging performance on the screen 90 may be improved. Further, when a reflection mirror having positive power in the second optical system 13 has an anamorphic polynomial adjustable curved surface shape, it may become possible to adjust the curved surface shape of the reflection surface for individual reflection areas of the respective image heights, thereby enabling improving the aberration correction performance.

Further, the term "anamorphic polynomial adjustable curved surface" is a shape expressed by the following formula (2) where the X direction corresponds to the up-and-down direction and the Y direction corresponds to the left-and-right direction when the projection image is taken as reference and the symbols "X2, Y2, X2Y, Y3, X2Y2 and the like" are coefficients.

$$Z = X2 \cdot x^2 + Y2 \cdot y^2 + X2Y \cdot x^2 y + Y3 \cdot y^3 + X4 \cdot x^4 + X2Y2 \cdot x^2 y^2 + Y4 \cdot y^4 X4Y \cdot x^4 y + X2Y3 \cdot x^2 y^3 + Y5 \cdot y^5 X6 \cdot x6 + X4Y2 \cdot x^4 y^2 + X2Y4 \cdot x^2 y^4 + Y6 \cdot y^6 + \ldots \quad (2)$$

In this first embodiment, as the second optical system 13, a reflection surface having a concave shape is used. However, the present invention is not limited to this configuration. For example, any appropriate reflection optical element having light focusing power (effect) such as a Fresnel reflection mirror or a hologram reflection mirror may be used.

Figure 3:
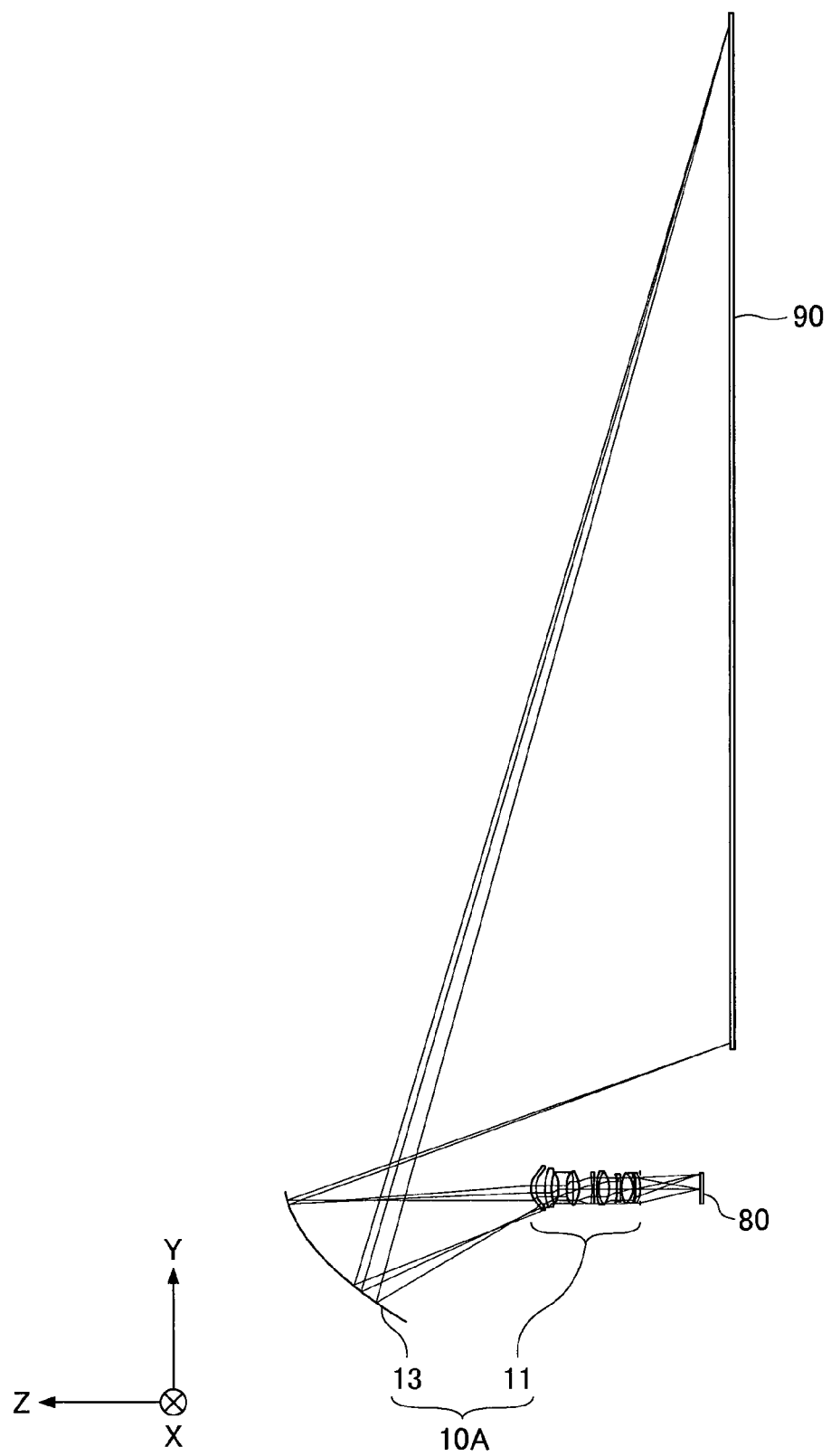
FIG. 3 is a ray diagram illustrating a projection optical system as a Comparative Example 1.
Figure 4:
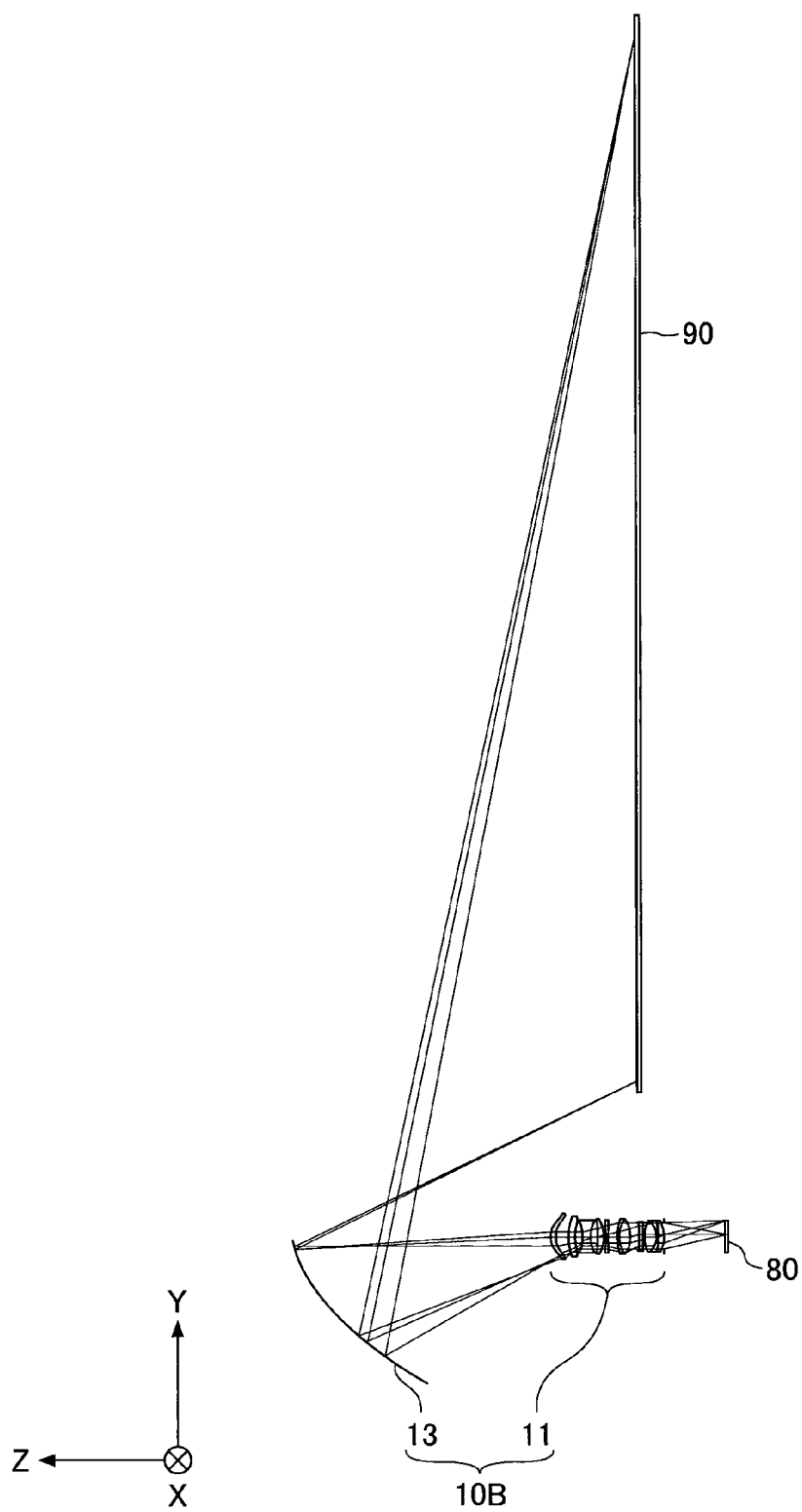
FIG. 4 is a ray diagram illustrating a projection optical system as a Comparative Example 2.

Next, with reference to comparative examples in FIGS. 3 and 4, an effect of the projection optical system 10 according to this embodiment of the present invention is additionally described. FIG. 3 is a ray diagram illustrating a projection optical system of a Comparative Example 1. FIG. 4 is a ray diagram illustrating a projection optical system of a Comparative Example 2. In the coordinate system of FIGS. 3 and 4, the symbol X denotes the long axis direction of the screen, the symbol Y denotes the short axis direction of the screen, and the symbol Z denotes the normal direction of the screen. Referring to FIGS. 3 and 4, a projection optical system 10A in Comparative Example 1 and a projection optical system 10B in Comparative Example 2 are the same as the projection optical system 10 of this first embodiment except that no folding mirror 12 is provided.

In the projection optical system 10A illustrated in FIG. 3, similar to the projection optical system 10, the projection distance may be reduced. However, when the projection distance is to be further reduced. Similar to the projection optical system 10B as illustrated in FIG. 4, the projection distance is less than the total length of the projection optical system 10B. In the projection optical system 10B of FIG. 4, a part of the first optical system 11 is disposed on the right-hand side of the screen 90. Therefore, it is necessary for the part of the projection optical system 10B to be buried behind (into) the screen, which may make it hard to use.

Such a problem may be avoided by providing the folding mirror 12 between the first optical system 11 and the second optical system 13 as in the projection optical system 10 in the first embodiment.

However, in the case where the folding mirror 12 is provided as in the projection optical system 10, there may arise a problem that "the light reflected by the folding mirror 12 is blocked by the first optical system 11" or a problem that "the light reflected by the second optical system 13 is blocked by the folding mirror 12". Therefore, to avoid such problems, it may be necessary to appropriately determine the position of the folding mirror 12.

Namely, it may be necessary to appropriately determine parameters including $d_1$ and $d_2$ described below. The values of the parameters including $d_1$ and $d_2$ are required to be appropriately determined by considering whether the folding structure can be used, whether the performances can be maintained and the like, and based on the lens data.

Figure 5:
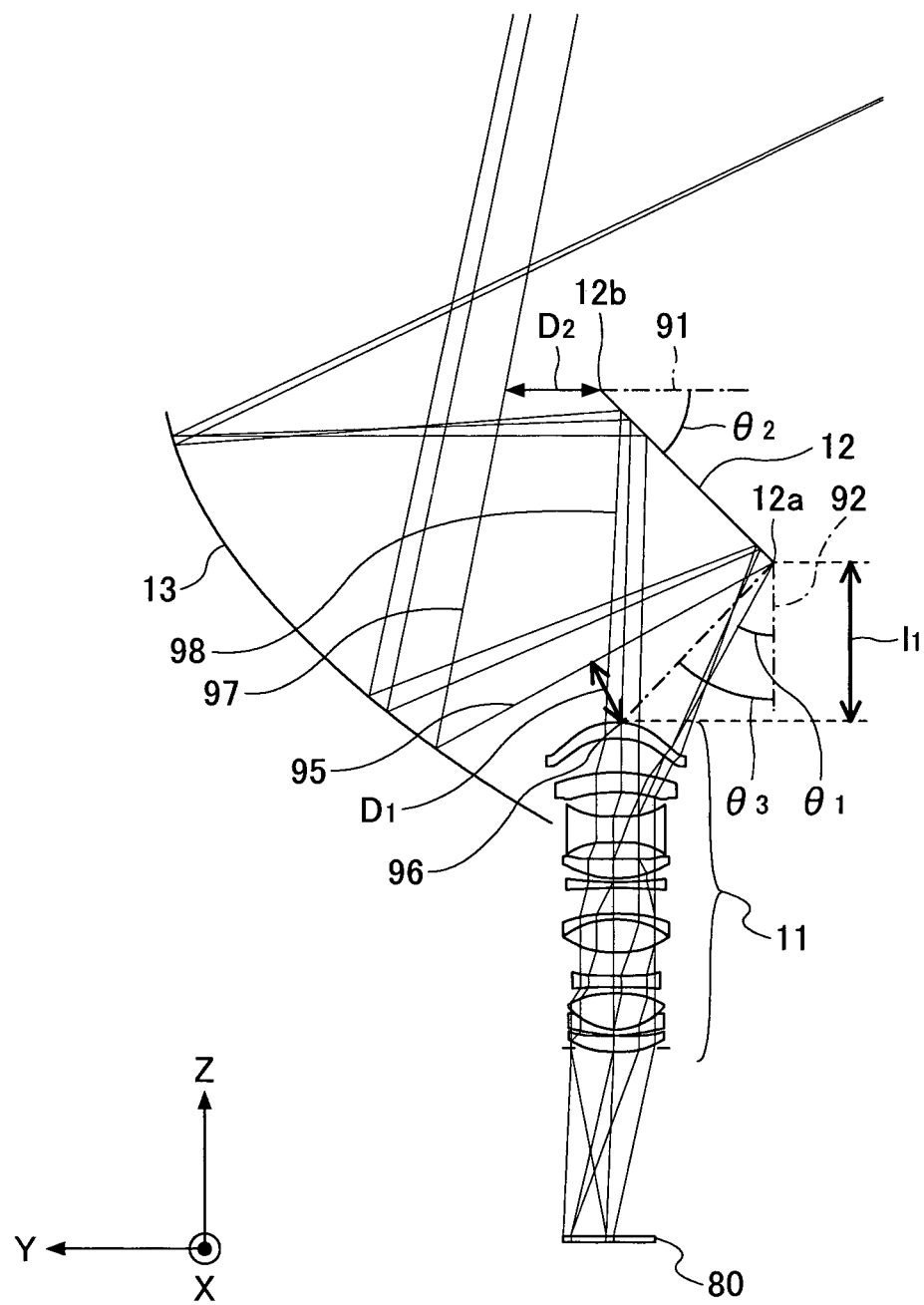
FIG. 5 is a (first) drawing illustrating parameters.

Next, with reference to FIG. 5, a method of appropriately determining the parameters including $d_1$ and $d_2$ is described. FIG. 5 is a (first) drawing illustrating the parameters and an enlarged view in the vicinity of the first optical system 11. In the coordinate system of FIG. 5, the symbol X denotes the long axis direction of the screen, the symbol Z denotes the short axis direction of the screen, and the symbol Y denotes the normal direction of the screen. Referring to FIG. 5, the reference numerals 91 and 92 denote auxiliary (additional) lines for illustrating angles of light (hereinafter referred to as auxiliary lines 91 and 92, respectively). Specifically, the auxiliary line 91 is a line orthogonal to the optical axis of the first optical system 11, and the auxiliary line 92 is a line parallel to the optical axis of the first optical system 11.

In FIG. 5, a parameter (distance) $D_1$ denotes a distance between a light 95 and a point 96 in a normal direction from the light 95, the light 95 having been reflected by the folding mirror 112 at a position closest to an outer end 12a closer to the first optical system 11 of outer ends 12a and 12b of the folding mirror 12, the point 96 being the intersection of a surface in the first optical system 11 and the optical axis of the first optical system 11, the surface being the closest to the light 95. On the other hand, a parameter (distance) $D_2$ denotes a distance between a light 97 and the outer end 12b in a normal direction from the optical axis of the first optical system 11, the light 97 having been reflected by the second optical system 13 and being closest to the outer end 12b which is farther from the first optical system 11 of the outer ends 12a and 12b of the folding mirror 12, the outer end 12b being farther from the first optical system 11.

Then, when symbols $d_1$ and $d_2$ are given by dividing $D_1$ and $D_2$, respectively, by a focal length f (i.e., $d_1 = D_1/f$, $d_2 = D_2/f$), the parameter $d_1$ is expressed as in the following formula (3).

$$d_1 = \frac{l_1}{f \cos \theta_3} \sin(2\theta_2 - \theta_1 - \theta_3) \quad (3)$$

In formula (3), the symbol $l_1$ denotes a distance in the optical axis direction of the first optical system 11 between a surface in the first optical system 11 and the outer end 12a, the surface being closest to the folding mirror 12, the outer end 12a being closer to the first optical system 11 of the outer ends 12a and 12b of the folding mirror 12; the symbol f denotes the focal length of the first optical system 11; the symbol $\theta_1$ denotes an emission angle of light relative to the auxiliary line 92 (i.e., the optical axis direction of the first optical system 11), the light being to be reflected by the folding mirror 12 at a position closest to the outer end 12a of the outer ends 12a and 12b of the folding mirror 12 and being emitted from a surface closest to the folding mirror 12, the surface being included in the first optical system 11; the symbol $\theta_2$ denotes an angle of the folding mirror 12 relative to the auxiliary line 91 (i.e., the normal direction of the optical axis of the first optical system 1); and the symbol $\theta_3$ denotes an angle of a line relative to the auxiliary line 92 (i.e., the optical axis direction of the first optical system 11), the line connecting between the outer end 12a and the point 96, the outer end 12a being closer to the first optical system 11 of the outer ends 12a and 12b of the folding mirror 12, the point 96 being the intersection of a surface in the first optical system 11 and the optical axis of the first optical system 11, the surface being the closest to the folding mirror 12.

Figure 6:
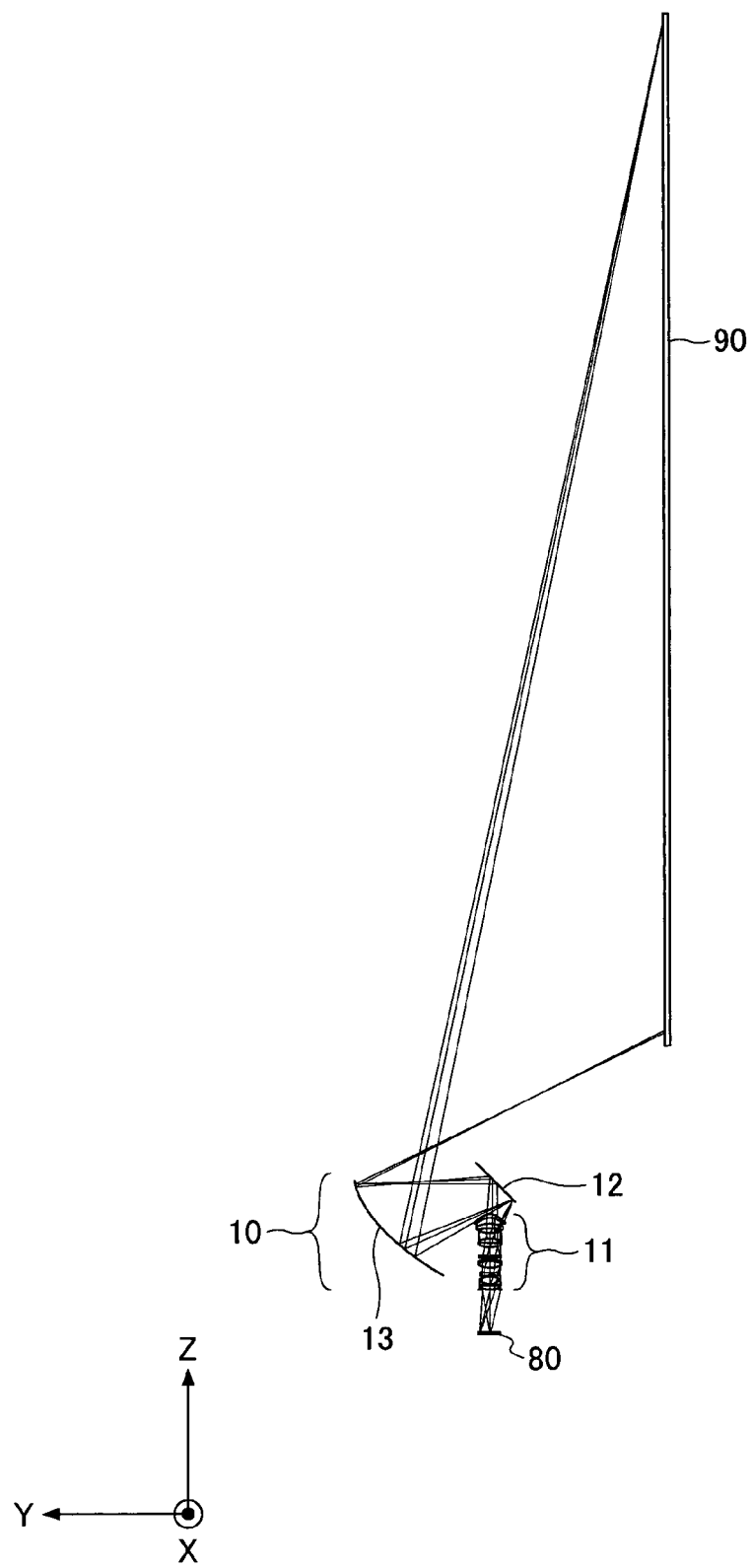
FIG. 6 is a ray diagram illustrating the projection optical system of FIG. 1 when a parameter $D_1$ is a negative value.
Figure 7:
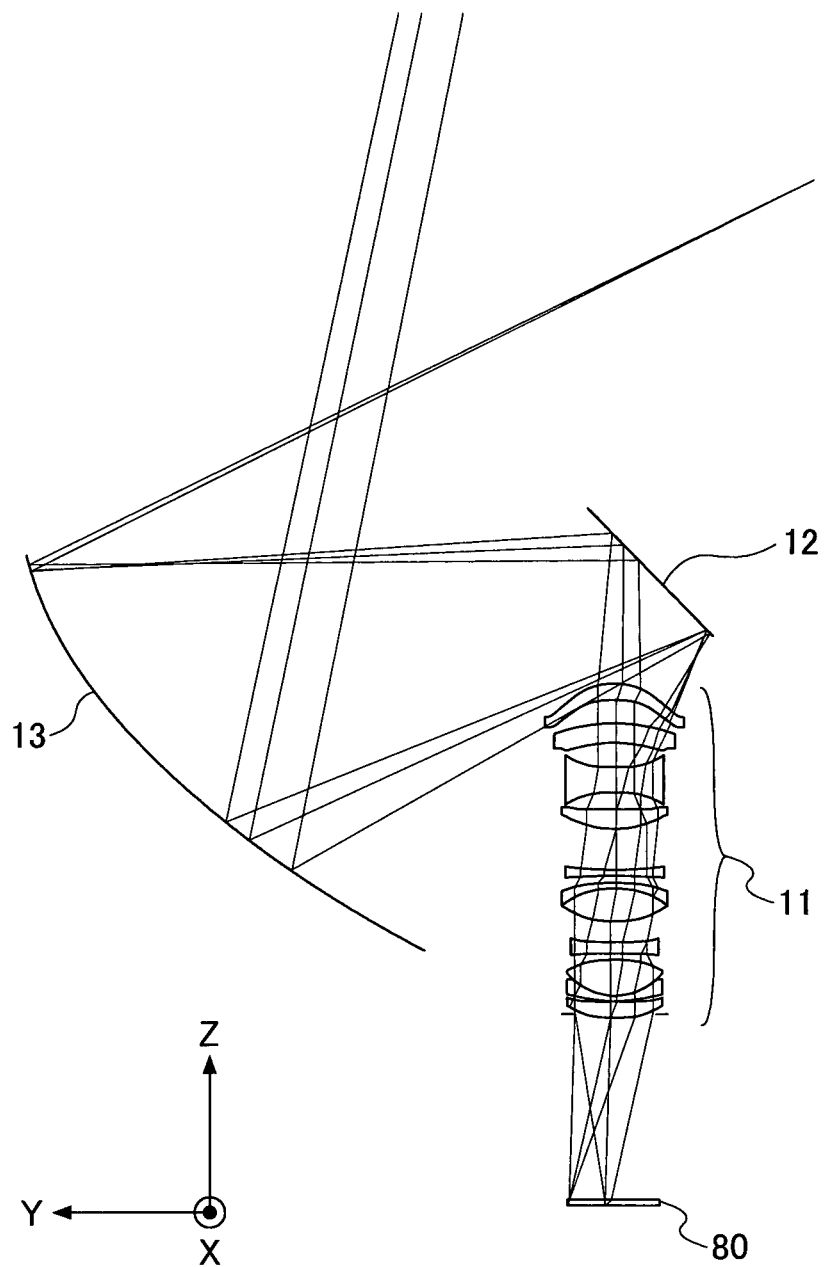
FIG. 7 is a partially enlarged ray diagram of FIG. 6.

First, a method of determining the parameter $d_1$ is described. FIG. 6 is a ray diagram illustrating a case where the distance $D_1$ is a negative value in the projection optical system of FIG. 1. FIG. 7 is a ray diagram enlarging a part of FIG. 6. In the coordinate system of FIGS. 6 and 7, the symbol X denotes the long axis direction of the screen, the symbol Z denotes the short axis direction of the screen, and the symbol Y denotes the normal direction of the screen. Referring to FIGS. 6 and 7, light reflected by the folding mirror 12 is blocked by the first optical system 11. On the other hand, when the distance $D_1$ is a positive value, no light reflected by the folding mirror is blocked by the first optical system 11.

Therefore, it may be preferable when $0<D_1$. However, when the actual assembly of the components of the projection optical system 10 is considered, it may be insufficient when $0<D_1$, and it is preferable when 10 mm≤$D_1$. For example, when f=23.5 mm as illustrated in Table 1 of Example 1 described below, when $D_1$=10 mm, $d_1$=0.43 is obtained based on $d_1$=$D_1$/f. Therefore, it is preferable that 0.43≤$d_1$.

However, it may not be sufficient to simply regulate the value of $d_1$. Namely, what are important are the surface shape of the lens and the positional relationships between light having been reflected by the folding mirror 12 and the lens. For example, when the change of the surface shape in the aspheric surface is large, there may be a case where the condition of $d_1$ is satisfied but the distance between the light and lens is too short. In such a case, it may be preferable to regulate using another parameter $d_3$ rather than the parameter $d_1$.

Figure 8:
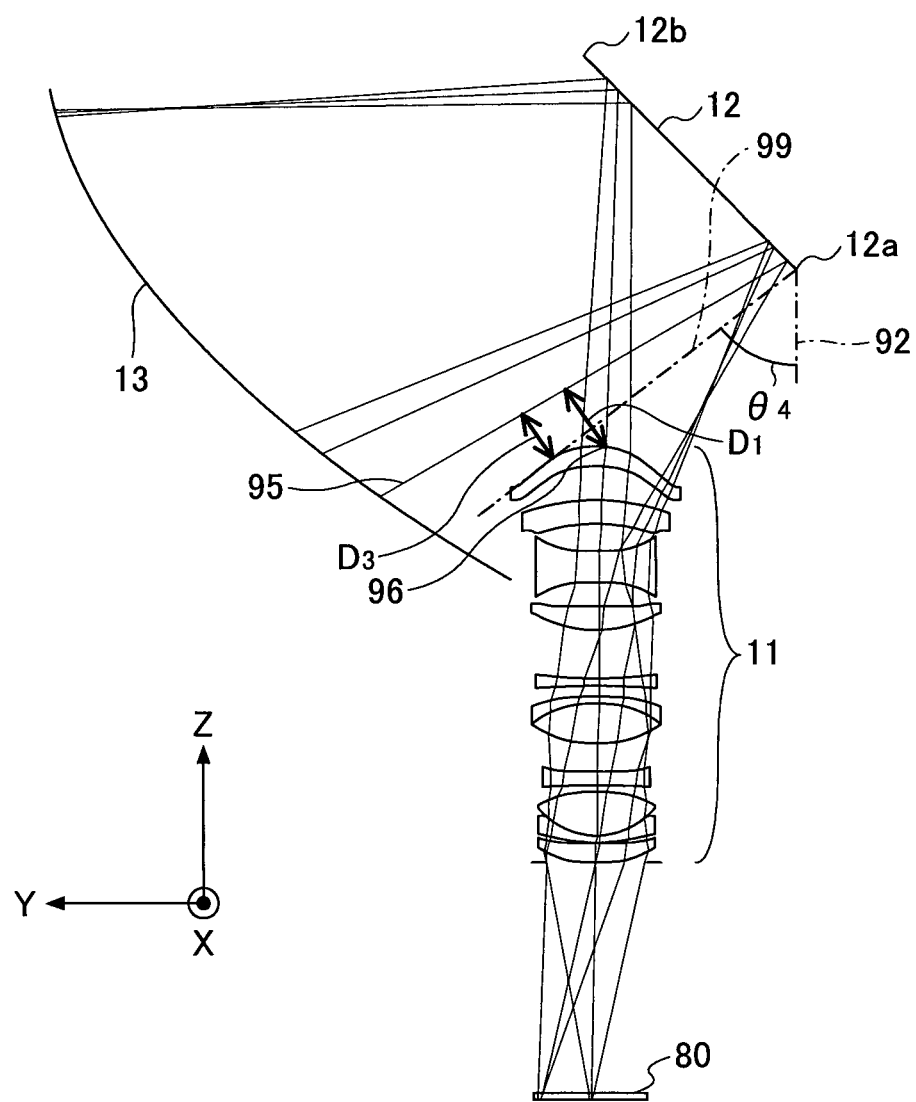
FIG. 8 is a (second) drawing illustrating parameters.

FIG. 8 is a (second) drawing illustrating the parameters. In the coordinate system of FIG. 8, the symbol X denotes the long axis direction of the screen, the symbol Z denotes the short axis direction of the screen, and the symbol Y denotes the normal direction of the screen. In FIG. 8, the symbol $\theta_4$ denotes an angle of a line 99 relative to the auxiliary line 92 (i.e., the optical axis direction of the first optical system 11), the line 99 being a tangent line drawn from the outer end 12a to a point of a surface in the first optical system 11, the outer end 12a being closer to the first optical system 11 of the outer ends 12a and 12b of the folding mirror 12, the surface being closest to the folding mirror 12; and the symbol $D_3$ denotes a distance in the normal direction of the light 95 between the light 95 and the point of the surface, the light 95 having been reflected by the folding mirror 12 at a point closest to the outer end 12a closer to the first optical system 11 of the outer ends 12a and 12b of the folding mirror 12.

As illustrated in FIG. 8, in a part closest to the folding mirror 12 in the first optical system 11, in a case where the change of the surface shape in the aspheric surface is large (i.e., when $d_3<d_1$), when the actual assembly of the components of the projection optical system is considered, it is preferable that 10 mm<$D_3$.

Then, when $d_3$ is given by dividing $D_3$ by the focal length f (i.e., $d_3$=$D_3$/f), the parameter $d_3$ is expressed as in the following formula (4).

$$d_3 = \frac{l_1}{f\cos\theta_4}\sin(2\theta_2 - \theta_1 - \theta_4) \tag{4}$$

For example, when f=23.5 mm as illustrated in Table 1 of Example 1 described below, when $D_1$=10 mm, $d_3$=0.43 is obtained based on $d_3$=$D_3$/f. Therefore, it is preferable that 0.43≤$d_3$. Further, the relationship $d_3<d_1$ is always satisfied, so that when the relationship 0.43≤$d_3$ is satisfied, the relationship 0.43≤$d_1$ is satisfied. Namely, when the change of the surface shape in the aspheric surface is large (i.e., when $d_3<d_1$), it is necessary to regulate with $d_3$ instead of with $d_1$, and it is preferable that the relationship 0.43≤$d_3$ is satisfied.

Figure 9:
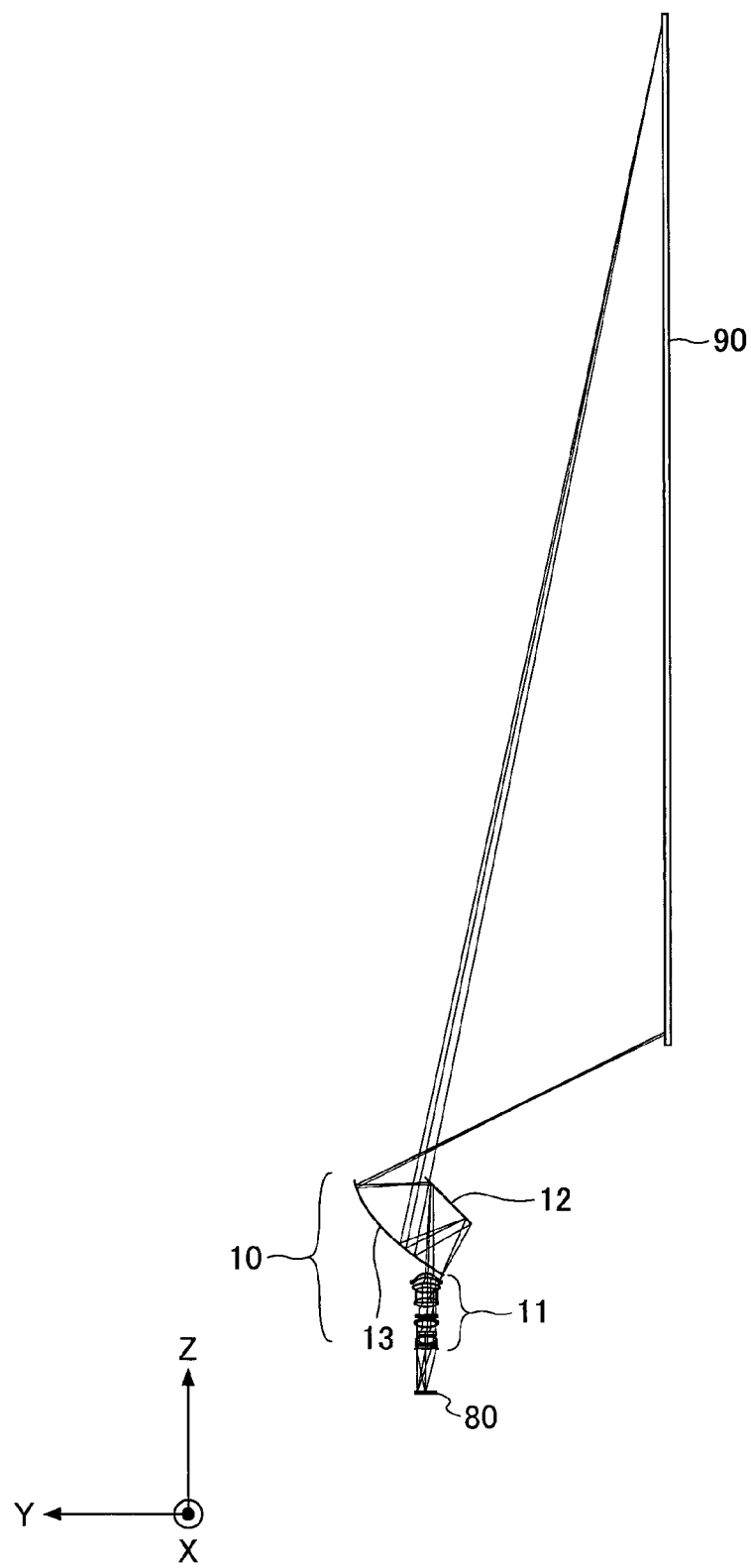
FIG. 9 is a ray diagram illustrating the projection optical system of FIG. 1 when a parameter $D_2$ is a negative value.
Figure 10:
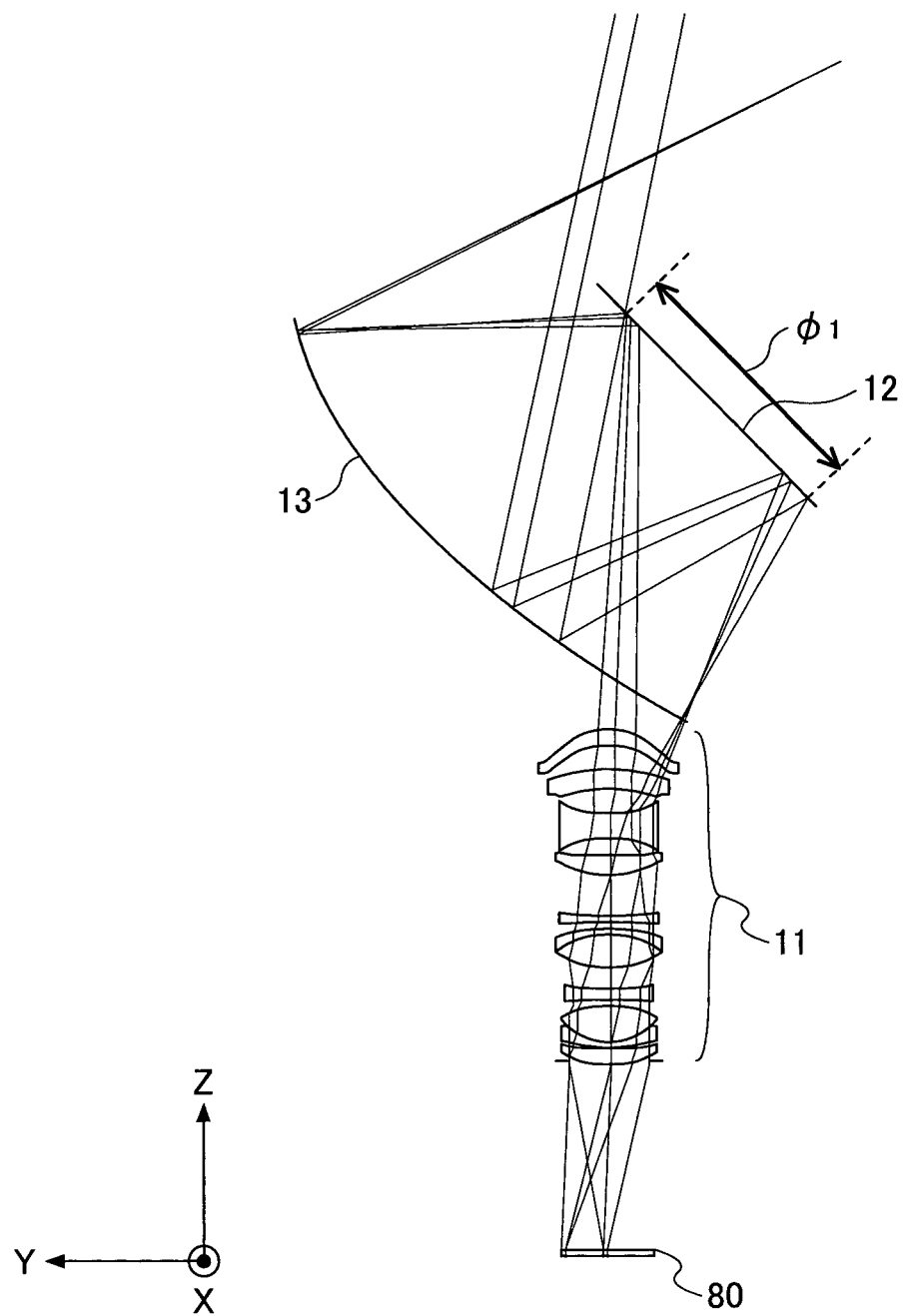
FIG. 10 is a partially enlarged ray diagram of FIG. 9.

Next, a method of determining the parameter $d_2$ is described. FIG. 9 is a ray diagram illustrating a case where the distance $D_2$ is a negative value in the projection optical system of FIG. 1. FIG. 10 is a ray diagram enlarging a part of FIG. 9. In the coordinate system of FIGS. 9 and 10, the symbol X denotes the long axis direction of the screen, the symbol Z denotes the short axis direction of the screen, and the symbol Y denotes the normal direction of the screen. Referring to FIGS. 9 and 10, the effective diameter $\phi_1$ of the folding mirror 12 is determined depending on the spreading range of light incident from the first optical system 11 onto the folding mirror 12. In the example of FIGS. 9 and 10, light reflected by the second optical system 13 is blocked by the folding mirror 12. Further, the second optical system 13 is disposed between the first optical system 11 and the folding mirror 12. To avoid the problems, it may be necessary to appropriately select the distance $D_2$.

Specifically, it may be preferable when $0<D_2$. However, when the actual assembly of the components of the projection optical system is considered, it may be insufficient when $0<D_2$, and it is preferable when 10 mm≤$D_2$. For example, in a case where f=23.5 mm as illustrated in Table 1 of Example 1 described below, when $D_2$=10 mm, $d_2$=0.43 is obtained based on $d_1$=$D_1$/f. Therefore, it is preferable that 0.43≤$d_2$.

As described above, the appropriate values of the parameters including $d_1$ and $d_2$ are required to be determined by considering whether the folding structure can be formed, whether the performances can be maintained and the like and based on the lens data. Further, it is preferable when 0.43≤$d_1$ and 0.43≤$d_2$. However, the upper values of $d_1$ and $d_2$ are determined based on a value of $l_2$ illustrated in FIG. 11. Further, there is a relationship between $d_1$ and $d_2$ that when one is increased the other is accordingly to be decreased. Therefore, it may be necessary to determine the upper values of $d_1$ and $d_2$. Further, FIG. 11 is a drawing illustrating the distance $l_2$, enlarging the parts near the first optical system 11 and the second optical systems 13 of FIG. 1, and eliminating the folding mirror 12, so that FIG. 11 illustrates a state where the light travels linearly.

Figure 11:
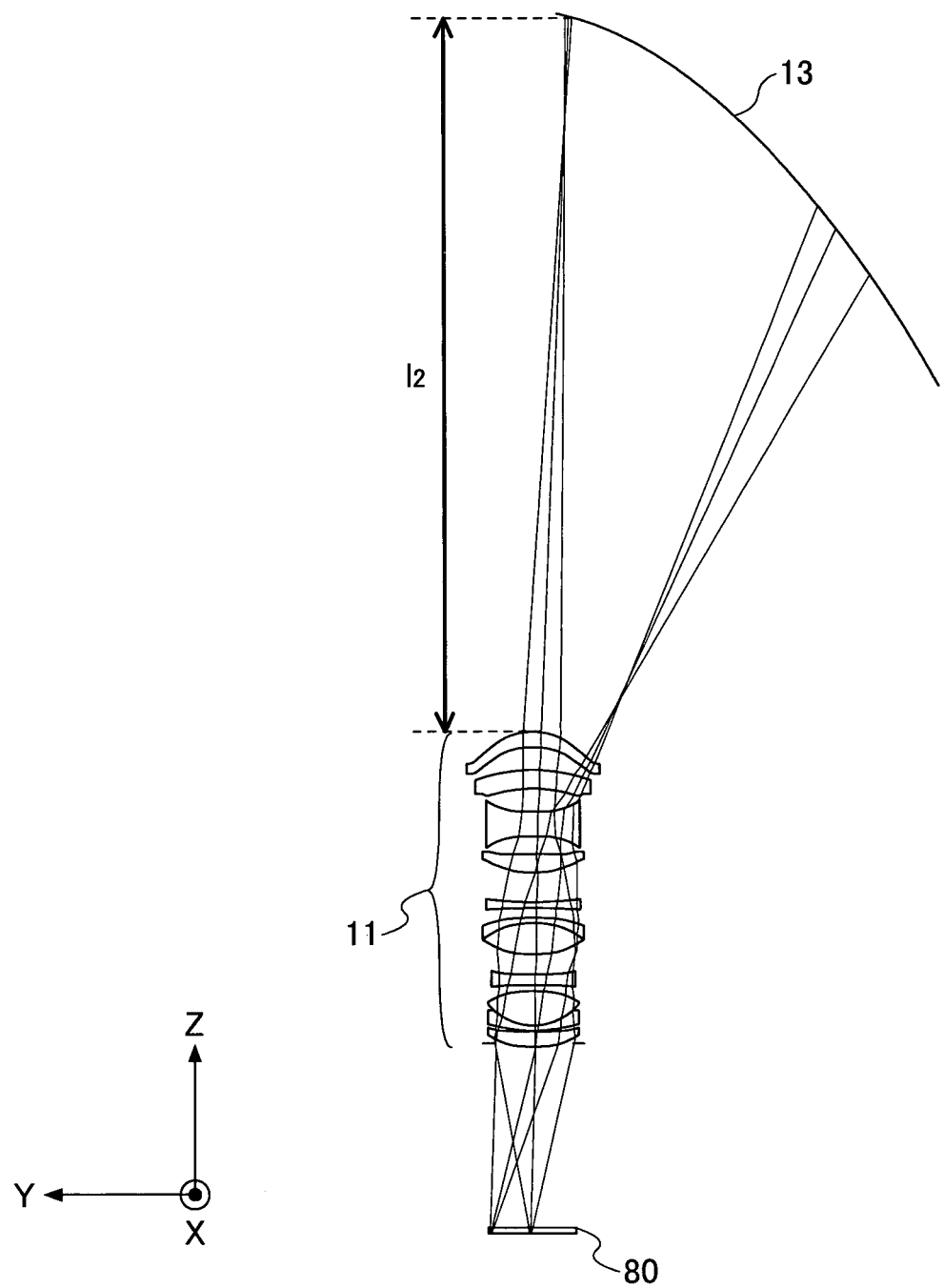
FIG. 11 is a drawing illustrating a parameter $l_2$.

Referring to FIGS. 5 and 11, the symbol $l_2$ denotes a distance traveled of the light 98 from a surface in the first optical system 11 to the second optical system 13, the light 98 being reflected by the folding mirror 12 at a position closest to the outer end 12b which is farther from the first optical system 11 of the outer ends 12a and 12b of the folding mirror 12, the surface being closest to the folding mirror 12.

For example, when f=23.5 mm as illustrated in Table 1 of Example 1 described below, as described above, $d_1$=0.43 is calculated and $d_2$=0.85 is obtained. This value is the upper limit of $d_2$. In the same manner, when $d_2$=0.43 is calculated, $d_1$=0.66 is obtained. This value is the upper value of $d_1$. Accordingly, it is preferable that 0.7≤$d_2$/$d_1$≤2.0. Further, the greater the value of $l_2$ becomes the more expanded the degree of freedom of the selection of $d_1$ and $d_2$ becomes.

Further, it is preferable to determine the appropriate value of $l_2$. By determining the appropriate value of $l_2$, it may become possible to make the projection optical system have a practical size and to ensure sufficient performance.

Figure 12:
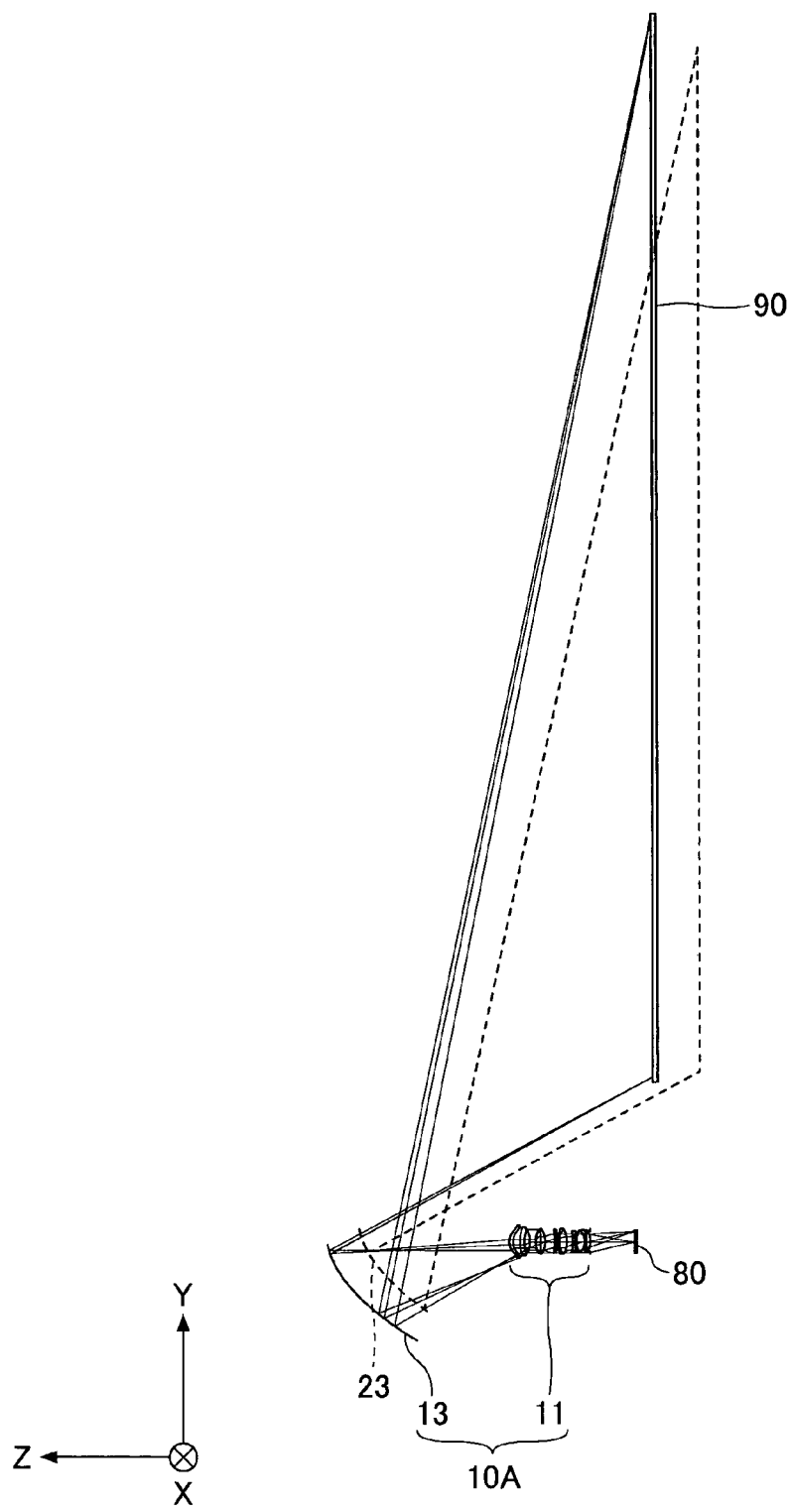
FIG. 12 is a (first) ray diagram illustrating a method of determining the parameter $l_2$.
Figure 13:
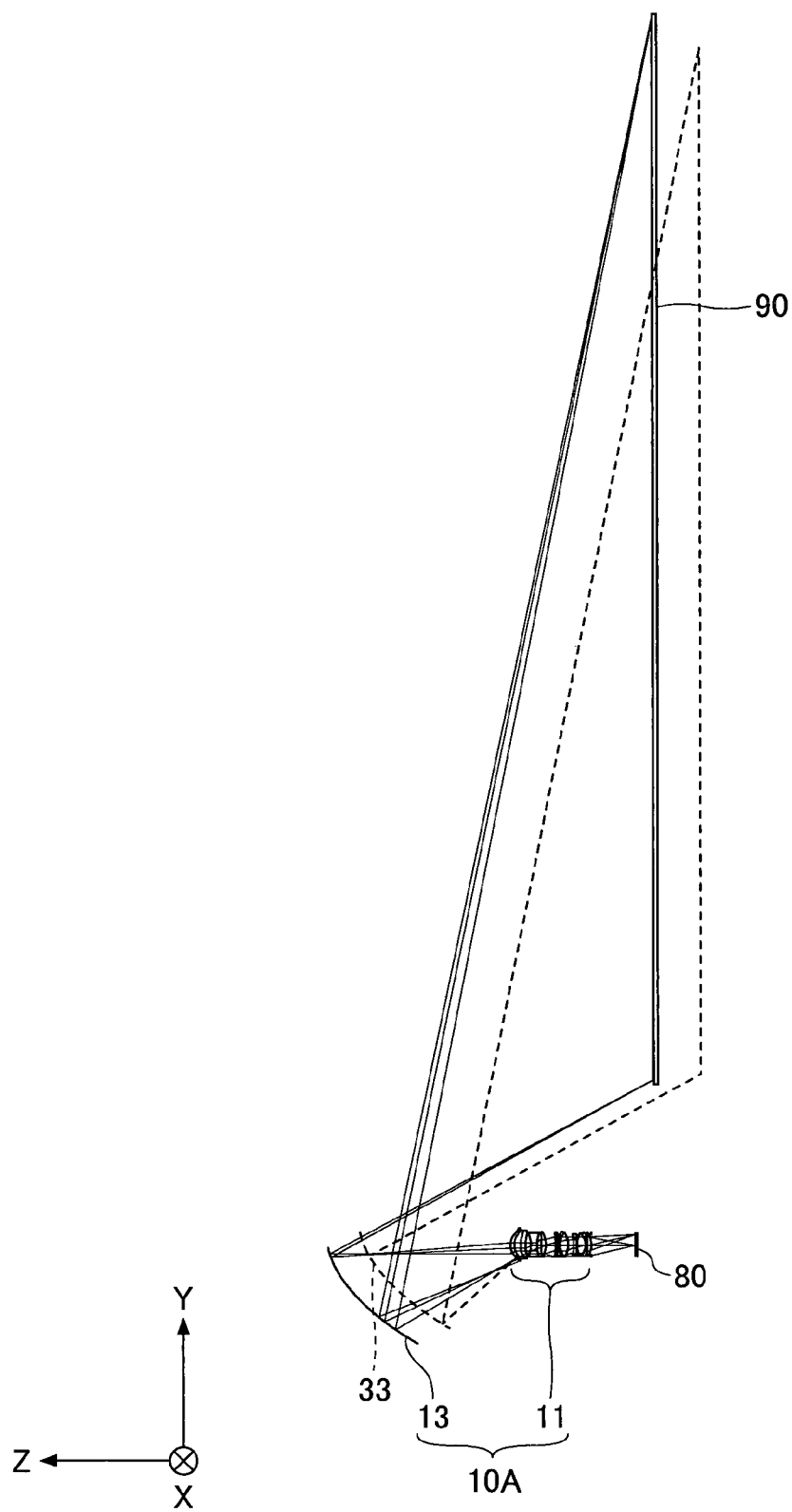
FIG. 13 is a (second) ray diagram illustrating a method of determining the parameter $l_2$.

In the following, a method of determining the distance $l_2$ is described. FIG. 12 is a (first) ray diagram illustrating a method of determining $l_2$. FIG. 13 is a (second) ray diagram illustrating a method of and 13, the symbol X denotes the long axis direction of the screen, the symbol Y denotes the short axis direction of the screen, and the symbol Z denotes the normal direction of the screen. Herein, for simplification purposes, the method is described using the optical system having no folding mirror 14 as illustrated in FIG. 3.

As illustrated in FIG. 12, it is assumed that the second optical system 13 is moved to a position of a second optical system 23. In other words, it is assumed that the distance $l_2$ is reduced while the projection distance and the projection size are unchanged. Due to the positional change, the light path changes from the solid line to the dotted line in FIG. 12. This is because, for example, when the reflection mirror having positive power in the second optical system 23 has the anamorphic polynomial adjustable curved surface shape, a usable area of the reflection mirror having the adjustable curved surface shape in the second optical system 23 becomes narrower than a usable area of the reflection mirror having the adjustable curved surface shape in the second optical system 13. The reflection mirror having the adjustable curved surface shape allows aberration corrections by adjusting the curved surface shape of the reflection surface for each of the reflection areas corresponding to image heights. Therefore, the narrower the usable area of the reflection mirror having the adjustable curved surface shape becomes, the more difficult the aberration corrections may become and the more degraded the performance may become.

Next, the avoidance of the degradation of the performance due to the narrower usable range of the reflection mirror having the adjustable curved surface shape is described. To that end, as illustrated in FIG. 13, instead of using the second optical system 23 (in FIG. 12), a second optical system 33 having a wider usable range of the reflection mirror is used. As illustrated in the light paths of FIG. 13, the angles of light passing through the first optical system 11 become tight. This means that the first optical system 11 has greater power than in a case of Example 1 described below, which may increase the aberrations. As a result, the performance in this case may also be degraded.

As described above, when the distance $l_2$ is reduced, the performance may be degraded. Therefore, it may be necessary to determine the lower limit of $l_2$. As a result of studies by the inventors, sufficient performance can be ensured when the parameters have the respective values as illustrated in Table 1 of Example 1 described below (i.e., when $6.3 \le l_2/f$). On the other hand, when the distance $l_2$ is increased, the size of the projection optical system is accordingly increased, which may become a cause of performance degradation. Therefore, it is preferable to determine the upper limit of $l_2$. As a result of studies by the inventors, it is ascertained that when $l_2/f \le 9.0$, the projection optical system has a practical size and sufficient performance is ensured. As a result of the above studies, it is preferable that $6.3 \le l_2/f \le 9.0$.

On the other hand, when the angle $\theta_2$ is increased, the folding structure may be more easily formed, but the size of the projection optical system may be accordingly increased. From the viewpoint of the size, it is preferable that $45° \le \theta_2 \le 60°$.

As described above, in the projection optical system according to the first embodiment of the present invention, by disposing the folding mirror between the first optical system and the second optical system, it may become possible to change the projection direction from the depth direction to the height direction even when the projection distance is less than the total length of the projection optical system. As a result, it may become possible to use the image projection device such as a projector without being buried behind the screen.

Further, by determining the values of $d_1$ and $d_2$ which are the parameters of the projection optical system according to the first embodiment of the present invention in a manner such that the relationships "$0.43 \le d_1$, $0.43 \le d_2$, and $0.7 \le d_2/d_1 \le 2.0$" are satisfied, it may become possible to avoid the problem that light reflected by the folding mirror is blocked by the first optical system and the problem that light reflected by the second optical system is blocked by the folding mirror. Further, when $d_3 < d_1$, by determining the value of $d_3$ to be "$0.43 \le d_3$", it may become possible to avoid the above problems.

Further, by determining the value of $l_2$ which is the parameters of the projection optical system according to the first embodiment of the present invention in a manner such that the relationship "$6.3 \le l_2/f \le 9.0$" is satisfied, it may become possible to make the projection optical system to have a practical size and to ensure that the projection optical system has sufficient performance as the optical system.

Further, by determining the value of the angle $\theta_2$ of the folding mirror in a manner such that the relationship "$45° \le \theta_2 \le 60°$" is satisfied, it may become possible to make the projection optical system to have a practical size and easily form the folding structure without greatly degrading the performance. In other words, it may become possible to increase the degree of freedom of disposing the folding mirror at a position so as to avoid the problem that light reflected by the folding mirror is blocked by the first optical system and the problem that light reflected by the second optical system is blocked by the folding mirror.

Further, light fluxes imaged on the positions on the screen correspond to the local reflection areas for respective image heights in the second optical system. Therefore, by making the surface shape of the second optical system to be an adjustable curved surface shape and adjusting the curved surface shape of the reflection surfaces for the reflection areas corresponding to image heights, it may become possible to most effectively correct aberrations, thereby enabling improving the performance.

Further, by making the first optical system to have an aspheric-shaped refracting surface, it may become possible to increase the degree of freedom of the first optical system, which allows realizing a projection optical system having higher performance.

Further, by using a flat mirror as the folding mirror, it may become possible to reduce the cost when compared with a case of a mirror having the aspheric shape or the adjustable curved surface shape.

Further, by making the first optical system as a coaxial system, it may become possible to make the assembly easier.

Next, Examples are described.

Example 1

In Example 1, it is assumed that $d_1=0.49$ and $d_2=0.77$. The values of the other parameters are illustrated in Table 1 below. In Table 1, the unit of $l_1$, $l_2$, and f is "mm", and the unit of $\theta_1$, $\theta_2$, and $\theta_3$ is degrees (°).

TABLE 1

| PARAMETER | VALUE |
|---|---|
| $l_1$ | 30.1 |
| $l_2$ | 148.0 |
| f | 23.5 |
| $\theta_1$ | 30.0 |
| $\theta_2$ | 45.0 |
| $\theta_3$ | 44.0 |

According to the values of $d_1$ and $d_2$ and the values in Table 1, it is obtained that $d_2/d_1=1.6$, $l_2/f=6.3$, and $\theta_2=45°$, any of which satisfies the above relationships (conditions) "$0.43 \le d_1$, $0.43 \le d_2$, and $0.7 \le d_2/d_1 \le 2.0$, $6.3 \le l_2/f 9.0$, and $45° \le \theta_2 \le 60°$".

Next, Table 2 described below illustrates data in Example 1.

TABLE 2

| SURFACE NUMBER | CURVATURE RADIUS | SURFACE INTERVAL | REFRACTIVE INDEX | DISPERSION | SHIFT | TILT | SURFACE SHAPE |
|---|---|---|---|---|---|---|---|
| 0 | ∞ | 1.11 | | | | | SPHERIC |
| 1 | ∞ | 1.05 | 1.507 | 63.35 | | | SPHERIC |
| 2 | ∞ | 36.89 | | | | | SPHERIC |
| 3 DIAPHRAGM | ∞ | 0.00 | | | | −1 | SPHERIC |
| 4 | 23.5 | 3.22 | 1.514 | 63.9 | | | ASPHERIC SURFACE |
| 5 | −169.1 | 0.20 | | | | | ASPHERIC SURFACE |
| 6 | 30.0 | 1.00 | 1.879 | 39.6 | | | SPHERIC |
| 7 | 11.9 | 7.15 | 1.487 | 70.4 | | | SPHERIC |
| 8 | −20.0 | 1.00 | | | | | SPHERIC |
| 9 | −60.5 | 2.00 | 1.822 | 33.4 | | | SPHERIC |
| 10 | 42.3 | 4.65 | | | | | SPHERIC |
| 11 | 20.0 | 6.60 | 1.565 | 43.7 | | | SPHERIC |
| 12 | −16.8 | 1.00 | 1.835 | 43 | | | SPHERIC |
| 13 | −30.5 | 1.83 | | | | | SPHERIC |
| 14 | −79.3 | 1.00 | 1.497 | 81.6 | | | SPHERIC |
| 15 | 69.3 | 7.80 | | | | | SPHERIC |
| 16 | 20.4 | 3.92 | 1.676 | 40.2 | | | SPHERIC |
| 17 | 561.1 | 3.49 | | | | | SPHERIC |
| 18 | −24.7 | 5.11 | 1.833 | 41.3 | | | SPHERIC |
| 19 | 19.3 | 4.51 | | | | | SPHERIC |
| 20 | −17.3 | 3.93 | 1.531 | 55.8 | | | ASPHERIC SURFACE |
| 21 | −22.2 | 5.18 | | | | | ASPHERIC SURFACE |
| 22 | −18.1 | 3.12 | 1.531 | 55.8 | | | ASPHERIC SURFACE |
| 23 | −15.4 | 21.07 | | | | | ASPHERIC SURFACE |
| 24 | ∞ | 40.00 | | | | | SPHERIC |
| 25 | ∞ | −48.00 | REFLECT | | | −45 | SPHERIC |
| 26 | −1148.3 | 236.07 | REFLECT | | −58.515 | 49.7391 | POLYNOMIAL ADJUSTABLE CURVED SURFACE |
| 27 | ∞ | 0.00 | | | | | SPHERIC |

In Table 2, the "Surface number" refers to numbers assigned to surfaces of the lenses and increases from the object side. Specifically, one surface of the image forming element 80 (the surface farther from the first optical system 11) refers to the 0th surface. The other surface of the image forming element 80 refers to the 1st surface. The surfaces of the first optical system 11 from the side of the image forming element 80 refer to the 3rd to 24th surfaces. The folding mirror 12 refers to the 25th surface. The second optical system 13 refers to the 26th surface. The screen 90 refers to the 27th surface. The "Curvature radius" refers to the curvature radii of the surfaces having the surface numbers. The "Surface interval" refers to the distance on the axis from the numbered surface to the next surface. The "Refractive index" refers to the refractive index of the lens formed between the surface of the corresponding surface number and the surface of the next surface number. The "Dispersion" is expressed as the Abbe number which is a value of d line along with the refractive index. The "Shift" refers to a shift eccentricity amount, and the "Tilt" refers to a tilt eccentricity amount. The unit of measure of the Curvature radius, the Surface interval, and Shift eccentricity amount is "mm", and the unit of measure of the tilt eccentricity amount is "°". Further, as for the sign of the Shift and the Tilt, + sign is used in the Shift for the positive direction of the Y axis direction and + sign is used in the Tilt for the counterclockwise direction around the X axis. The above is also applied to Examples below.

The aspheric surfaces used in 4th, 5th, 20th, 21st, 22nd, and 23rd surfaces are rotationally symmetric aspheric surfaces. However, asymmetric aspheric surfaces may be used. As is known in the art, the rotationally symmetric aspheric surface is given by the aspheric equation "$Z = c \cdot r^2 / [1 + \sqrt{\{1 - (1+k)c^2 r^2\}}] + Ar^4 + Br^6 + Cr^8 + \ldots$" where "Z" denotes the depth of the optical axis, "c" denotes a paraxial curvature radius, "r" denotes the distance from the optical axis in the direction orthogonal to the axis direction, and "k" denotes the conical coefficient. "A", "B", "C", . . . denote high-order aspheric coefficients. The shape is specified by determining the values of k, A, B, C and the like. The above is also applied to Examples below.

Table 3 illustrates the coefficients of the aspheric surfaces in Example 1.

TABLE 3

| COEFFICIENT | 4TH SURFACE | 5TH SURFACE | 20TH SURFACE | 21ST SURFACE | 22ND SURFACE | 23RD SURFACE |
|---|---|---|---|---|---|---|
| CONICAL COEFFICIENT: k | 0 | 0 | 0 | 0 | 0 | 0 |
| FOURTH-ORDER COEFFICIENT: B | 8.227061E−05 | 9.955267E−05 | 1.775767E−04 | 8.144775E−05 | −1.071179E−04 | −6.215357E−05 |
| SIXTH-ORDER COEFFICIENT: B | 1.963915E−07 | 2.538604E−07 | 2.149390E−06 | 1.907467E−07 | −6.172360E−07 | −5.390229E−07 |

TABLE 3-continued

| COEFFICIENT | 4TH SURFACE | 5TH SURFACE | 20TH SURFACE | 21ST SURFACE | 22ND SURFACE | 23RD SURFACE |
|---|---|---|---|---|---|---|
| EIGHTH-ORDER COEFFICIENT: B | 3.402974E−09 | 2.103399E−09 | −1.150242E−07 | −1.443357E−08 | 1.043242E−08 | 1.190752E−08 |
| TENTH-ORDER COEFFICIENT: B | −3.255382E−11 | 1.251145E−11 | 2.544557E−09 | 1.585259E−10 | 4.201341E−12 | −1.388212E−10 |
| TWELFTH-ORDER COEFFICIENT: B | −1.618297E−13 | −1.026672E−12 | −2.824568E−11 | −3.068536E−13 | −9.499176E−14 | 1.317858E−12 |
| FOURTEENTH-ORDER COEFFICIENT: B | 6.132829E−15 | 1.254136E−14 | 1.590174E−13 | −4.033239E−15 | −4.234670E−16 | −5.506125E−15 |
| SIXTEENTH-ORDER COEFFICIENT: B | 0 | 0 | −3.603504E−16 | 1.822642E−17 | 1.343150E−18 | 8.030897E−18 |

Table 4 illustrates the coefficients of the polynomial adjustable curved surfaces in Example 1. The coefficients of the polynomial adjustable curved surfaces correspond to the above formula (2).

TABLE 4

| COEFFICIENT | VALUE OF COEFFICIENT | COEFFICIENT | VALUE OF COEFFICIENT |
|---|---|---|---|
| X8Y3 | −1.83451E−18 | X2 | 6.90009E−03 |
| X6Y5 | −3.65090E−19 | Y2 | 2.81858E−03 |
| X4Y7 | 8.26438E−19 | X2Y | 4.44629E−05 |
| X2Y9 | −1.69295E−18 | Y3 | 3.23567E−06 |
| Y11 | −8.02167E−19 | X4 | 2.15017E−07 |
| X12 | 2.71346E−20 | X2Y2 | 6.46894E−07 |
| X10Y2 | −2.49447E−20 | Y4 | 8.11435E−08 |
| X8Y4 | −4.90264E−21 | X4Y | 3.82612E−09 |
| X6Y6 | −4.13650E−20 | X2Y3 | 7.80283E−09 |
| X4Y8 | −2.62478E−20 | Y5 | 2.91554E−09 |
| X2Y10 | 5.60614E−20 | X6 | −1.25061E−10 |
| Y12 | −6.47013E−21 | X4Y2 | −1.81432E−11 |
| X12Y | 2.11719E−22 | X2Y4 | 1.13225E−10 |
| X10Y3 | 1.25614E−21 | Y6 | 6.51812E−12 |
| X8Y5 | −1.06646E−21 | X6Y | −4.08129E−12 |
| X6Y7 | −1.95060E−22 | X4Y3 | −2.38189E−12 |
| X4Y9 | 2.53308E−22 | X2Y5 | −6.60692E−13 |
| X2Y11 | −1.83495E−22 | Y7 | −3.66693E−12 |
| Y13 | 4.28249E−22 | X8 | 1.34403E−13 |
| X14 | −3.94311E−24 | X6Y2 | 5.19629E−14 |
| X12Y2 | 1.06669E−23 | X4Y4 | −1.02085E−13 |
| X10Y4 | −1.41249E−23 | X2Y6 | 4.47863E−15 |
| X8Y6 | 1.55692E−23 | Y8 | 3.50359E−14 |
| X6Y8 | 1.17364E−23 | X8Y | 3.87703E−15 |
| X4Y10 | −9.09887E−24 | X6Y3 | 3.03998E−15 |
| X2Y12 | −6.76570E−24 | X4Y5 | 1.23131E−15 |
| Y14 | −4.21775E−24 | X2Y7 | 3.21303E−15 |
| X14Y | 2.79140E−26 | Y9 | 1.67936E−15 |
| X12Y3 | −3.55954E−25 | X10 | −8.05177E−17 |
| X10Y5 | 4.66445E−25 | X8Y2 | 5.01392E−19 |
| X8Y7 | −1.19101E−25 | X6Y4 | 1.07016E−16 |
| X6Y9 | 6.74353E−27 | X4Y6 | 4.19776E−17 |
| X4Y11 | 9.72070E−26 | X2Y8 | −5.11164E−17 |
| X2Y13 | 5.59308E−26 | Y10 | 2.52155E−18 |
| Y15 | 1.15168E−26 | X10Y | −1.62578E−18 |

Figure 14:
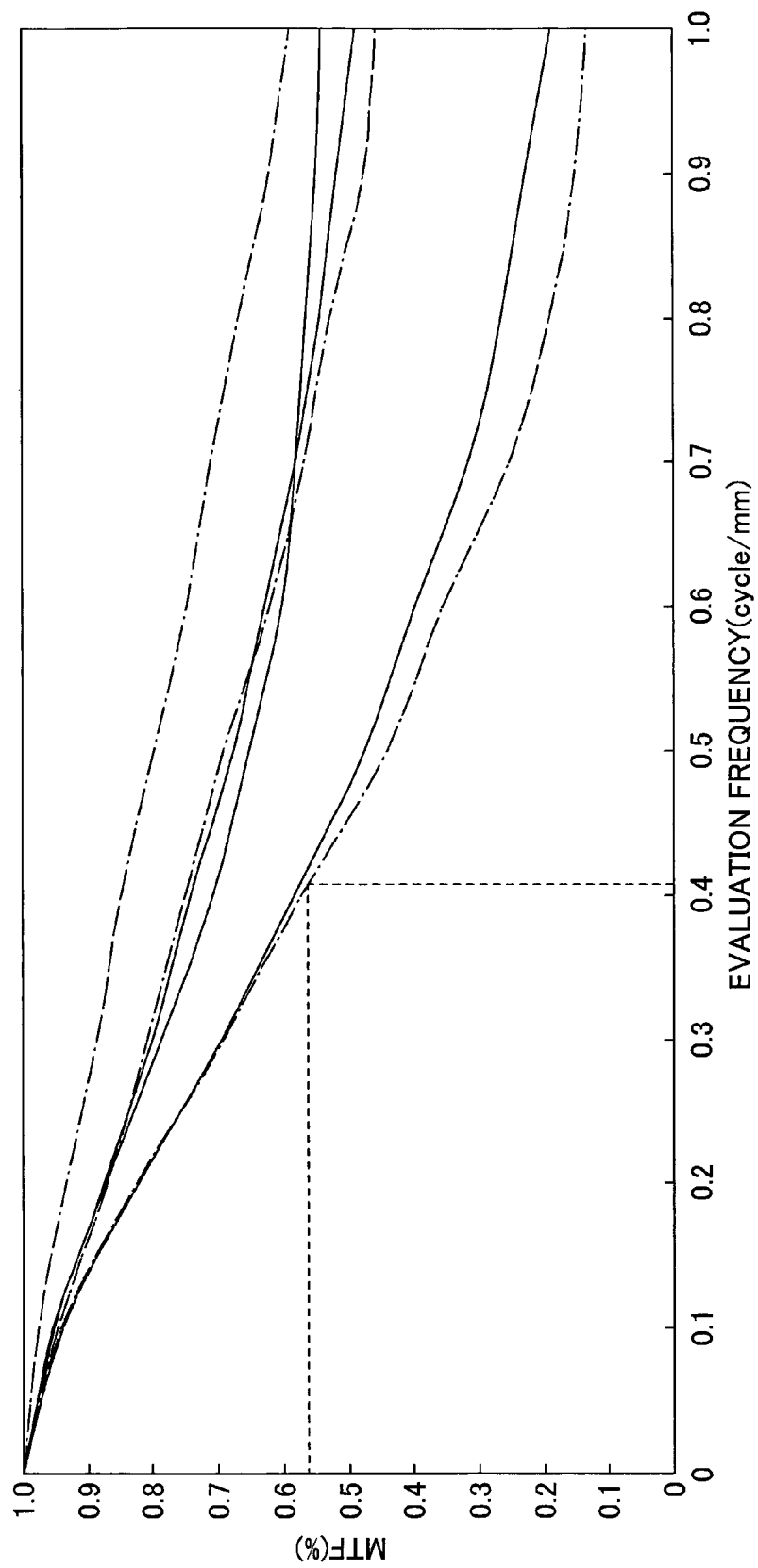
FIG. 14 is a drawing illustrating final resolution performance data on the screen in a first example.

FIG. 14 illustrates example resolution performance finally obtained on the screen in Example 1. In the results of FIG. 14, it is assumed that the panel as the image forming element 80 has the diagonal size of 0.54 inches and the aspect ratio of 3:4. The magnification ratio is approximately 111.1 times. The f-number of the emission light from the image forming element 80 is f/2.5. According to FIG. 14, the MTF value at an evaluation frequency of 0.42 cycles/mm is equal to or greater than 50%. By further reducing the distance $l_2$, the improvement of the MTF may be expected. However, in the optical system in Example 1, When the distance $l_2$ is reduced to be equal to or less than 148 mm, the folding structure may not be achieved. Namely, light reflected by the folding mirror may be blocked by the first optical system 11, or light reflected by the second optical system 13 may be blocked by the folding mirror 12. Further, the evaluation frequency is a value determined based on the size of the white (black) area to be evaluated.

Example 2

In Example 1, it is assumed that $d_1=0.49$ and $d_2=0.77$. On the other hand, in this Example 2, it is assumed that $d_1=0.83$ and $d_2=0.72$. In Example 2, the descriptions of the elements same as those in Example 1 may be omitted. The parameters other than $d_1$ and $d_2$ and the values thereof are described in Table 5. In Table 5, the unit of measure of $l_1$, $l_2$, and f is "mm", and the unit of measure of $\theta_1$, $\theta_2$, and $\theta_3$ is degrees (°). As illustrated in FIG. 5, in Example 2, the distance $l_2$ is 160 mm ($l_2=160$ mm), which is greater than the distance $l_2$ of 148 mm in Example 1.

TABLE 5

| PARAMETER | VALUE |
|---|---|
| $l_1$ | 39.6 |
| $l_2$ | 160.0 |
| f | 25.1 |
| $\theta_1$ | 27.5 |
| $\theta_2$ | 45.0 |
| $\theta_3$ | 38.1 |

According to the values of $d_1$ and $d_2$ and the values in Table 5, it is obtained that $d_2/d_1=0.9$, $l_2/f=6.4$, and $\theta_2=45°$, any of which satisfies the above relationships (conditions) "$0.43 \le d_1$, $0.43 \le d_2$, and $0.7 \le d_2/d_1 \le 2.0$, $6.3 \le l_2/f \le 9.0$, and $45° \le \theta_2 \le 60°$".

Next, Table 6 described below illustrates data in Example 2.

TABLE 6

| SURFACE NUMBER | CURVATURE RADIUS | SURFACE INTERVAL | REFRACTIVE INDEX | DISPERSION | SHIFT | TILT | SURFACE SHAPE |
|---|---|---|---|---|---|---|---|
| 0 | ∞ | 1.11 | | | | | SPHERIC |
| 1 | ∞ | 1.05 | 1.507 | 63.35 | | | SPHERIC |
| 2 | ∞ | 36.89 | | | | | SPHERIC |
| 3 | ∞ | 0.00 | | | | −1 | SPHERIC |

TABLE 6-continued

| SURFACE NUMBER | CURVATURE RADIUS | SURFACE INTERVAL | REFRACTIVE INDEX | DISPERSION | SHIFT | TILT | SURFACE SHAPE |
|---|---|---|---|---|---|---|---|
| DIAPHRAGM | | | | | | | |
| 4 | 21.8 | 3.63 | 1.514 | 63.9 | | | ASPHERIC SURFACE |
| 5 | −321.2 | 0.20 | | | | | ASPHERIC SURFACE |
| 6 | 30.8 | 1.00 | 1.883 | 40.8 | | | SPHERIC |
| 7 | 11.8 | 7.27 | 1.487 | 70.4 | | | SPHERIC |
| 8 | −19.7 | 1.00 | | | | | SPHERIC |
| 9 | −45.7 | 2.00 | 1.819 | 31.7 | | | SPHERIC |
| 10 | 54.0 | 3.85 | | | | | SPHERIC |
| 11 | 22.1 | 7.37 | 1.565 | 43.5 | | | SPHERIC |
| 12 | −15.5 | 1.00 | 1.829 | 43.3 | | | SPHERIC |
| 13 | −27.9 | 1.45 | | | | | SPHERIC |
| 14 | −63.6 | 1.11 | 1.497 | 81.6 | | | SPHERIC |
| 15 | −100.7 | 5.41 | | | | | SPHERIC |
| 16 | 22.8 | 4.13 | 1.791 | 25.9 | | | SPHERIC |
| 17 | 39.1 | 3.52 | | | | | SPHERIC |
| 18 | −33.2 | 5.01 | 1.828 | 37.4 | | | SPHERIC |
| 19 | 18.3 | 5.60 | | | | | SPHERIC |
| 20 | −15.1 | 4.82 | 1.531 | 55.8 | | | ASPHERIC SURFACE |
| 21 | −22.0 | 2.38 | | | | | ASPHERIC SURFACE |
| 22 | −21.6 | 4.30 | 1.531 | 55.8 | | | ASPHERIC SURFACE |
| 23 | −16.3 | 33.25 | | | | | ASPHERIC SURFACE |
| 24 | ∞ | 40.00 | | | | | SPHERIC |
| 25 | ∞ | −48.00 | REFLECT | | | −45 | SPHERIC |
| 26 | −985.3 | 236.25 | REFLECT | | −58.996 | 48.9185 | POLYNOMIAL ADJUSTABLE CURVED SURFACE |
| 27 | ∞ | 0.00 | | | | | SPHERIC |

Similar to Example 1, the aspheric surfaces used in 4th, 5th, 20th, 21st, 22nd, and 23rd surfaces are rotationally symmetric aspheric surfaces. However, asymmetric aspheric surfaces may be used.

Table 7 illustrates the coefficients of the aspheric surfaces in Example 2.

TABLE 7

| COEFFICIENT | 4TH SURFACE | 5TH SURFACE | 20TH SURFACE | 21ST SURFACE | 22ND SURFACE | 23RD SURFACE |
|---|---|---|---|---|---|---|
| CONICAL COEFFICIENT: k | 0 | 0 | 0 | 0 | 0 | 0 |
| FOURTH-ORDER COEFFICIENT: B | 8.358625E−05 | 1.026035E−04 | 1.647839E−04 | 1.770800E−05 | −1.517795E−04 | −5.991419E−05 |
| SIXTH-ORDER COEFFICIENT: B | 1.417425E−07 | 1.898282E−07 | 1.742950E−06 | 1.136145E−07 | −7.626229E−07 | −5.664464E−07 |
| EIGHTH-ORDER COEFFICIENT: B | 3.470135E−09 | 3.233679E−09 | −1.160684E−07 | −1.564341E−08 | 1.074226E−08 | 1.180280E−08 |
| TENTH-ORDER COEFFICIENT: B | −2.792272E−11 | −7.894975E−12 | 2.550532E−09 | 1.535385E−10 | 6.832567E−12 | −1.402501E−10 |
| TWELFTH-ORDER COEFFICIENT: B | −1.638869E−13 | −7.480424E−13 | −2.812559E−11 | −3.056009E−13 | −8.822712E−14 | 1.308996E−12 |
| FOURTEENTH-ORDER COEFFICIENT: B | 5.013862E−15 | 1.025965E−14 | 1.598721E−13 | −3.860115E−15 | −4.656651E−16 | −5.520500E−15 |
| SIXTEENTH-ORDER COEFFICIENT: B | 0 | 0 | −3.606204E−16 | 1.948595E−17 | 1.098489E−18 | 8.119450E−18 |

Table 8 illustrates the coefficients of the polynomial adjustable curved surfaces in Example 2. The coefficients of the polynomial adjustable curved surfaces correspond to the above formula (2).

TABLE 8

| VALUE OF COEFFICIENT | COEFFICIENT | VALUE OF COEFFICIENT | COEFFICIENT |
|---|---|---|---|
| X2 | 6.88446E−03 | X8Y3 | −1.75401E−18 |
| Y2 | 2.74146E−03 | X6Y5 | −4.08567E−21 |
| X2Y | 4.38472E−05 | X4Y7 | 1.29040E−19 |
| Y3 | 3.49425E−06 | X2Y9 | −1.73452E−18 |
| X4 | 2.09227E−07 | Y11 | −8.28364E−19 |
| X2Y2 | 6.53634E−07 | X12 | 3.00503E−20 |
| Y4 | 7.70154E−08 | X10Y2 | −2.27484E−20 |
| X4Y | 5.89371E−09 | X8Y4 | −3.67904E−21 |
| X2Y3 | 8.62509E−09 | X6Y6 | −4.21991E−20 |
| Y5 | 2.72475E−09 | X4Y8 | −4.43447E−21 |
| X6 | −1.15853E−10 | X2Y10 | 5.92650E−20 |
| X4Y2 | −3.55595E−11 | Y12 | −6.26460E−21 |
| X2Y4 | 1.00377E−10 | X12Y | 2.30635E−22 |
| Y6 | 1.78858E−11 | X10Y3 | 1.32798E−21 |
| X6Y | −5.17641E−12 | X8Y5 | −1.16773E−21 |
| X4Y3 | −3.29892E−12 | X6Y7 | 3.27966E−22 |
| X2Y5 | −1.02969E−12 | X4Y9 | −3.69481E−22 |
| Y7 | −3.45930E−12 | X2Y11 | 2.20404E−22 |
| X8 | 1.16364E−13 | Y13 | 4.31389E−22 |
| X6Y2 | 5.08151E−14 | X14 | −4.92944E−24 |
| X4Y4 | −9.59747E−14 | X12Y2 | 8.88382E−24 |
| X2Y6 | 1.19956E−14 | X10Y4 | −7.77832E−24 |
| Y8 | 1.29345E−14 | X8Y6 | 6.91752E−24 |
| X8Y | 3.76035E−15 | X6Y8 | 9.52269E−24 |
| X6Y3 | 2.91449E−15 | X4Y10 | −3.41545E−24 |
| X4Y5 | 1.44323E−15 | X2Y12 | −1.83521E−23 |
| X2Y7 | 2.99657E−15 | Y14 | −4.21711E−24 |
| Y9 | 2.13420E−15 | X14Y | 1.97720E−26 |
| X10 | −7.72566E−17 | X12Y3 | −4.01815E−25 |
| X8Y2 | 1.18432E−18 | X10Y5 | 4.45546E−25 |
| X6Y4 | 8.62461E−17 | X8Y7 | −8.74484E−26 |
| X4Y6 | 4.86642E−17 | X6Y9 | −3.54073E−26 |
| X2Y8 | −5.70557E−17 | X4Y11 | 9.85300E−26 |
| Y10 | −1.57380E−19 | X2Y13 | 1.36093E−25 |
| X10Y | −1.51362E−18 | Y15 | 1.11194E−26 |

Figure 15:
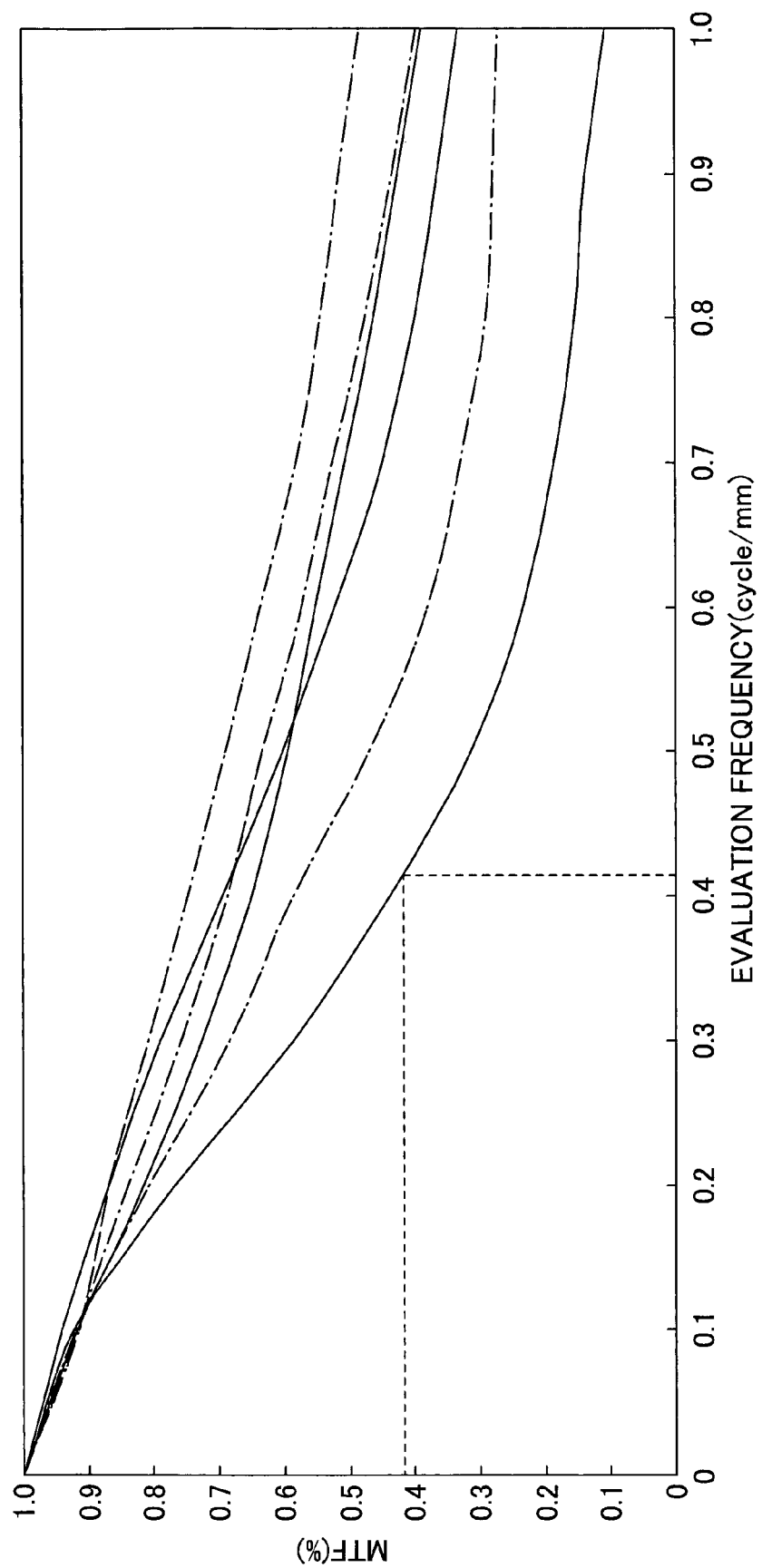
FIG. 15 is a drawing illustrating final resolution performance data on the screen in a second example.

FIG. 15 illustrates example resolution performance finally obtained on the screen in Example 2. In the results of FIG. 15, similar to Example 1, it is assumed that the panel as the image forming element 80 has the diagonal size of 0.54 inches and the aspect ratio of 3:4. The magnification ratio is approximately 111.1 times. The f-number of the emission light from the image forming element 80 is f/2.5. According to FIG. 14, the MTF value at an evaluation frequency of 0.42 cycles/mm is approximately 40%, which is worse than in Example 1. This is because the distance $l_2$ in Example 2 is greater than distance $l_2$ in Example 1. By further increasing the distance $l_2$, it may become possible to achieve the folding structure more easily. However, the MTF may be worse. Further, the size of the optical system may be increased. Therefore, it may be necessary to determine the distance $l_2$ within a range where the relationship "$6.3 \le l_2/f \le 9.0$" is satisfied. Further, the evaluation frequency is a value determined based on the size of the white (black) area to be evaluated.

Example 3

In Examples 1 and 2, it is assumed that $\theta_2=45°$. However, in Example 3, it is assumed that $\theta_2=60°$. In Example 3, the descriptions of the elements same as those in Example 1 may be omitted.

Figure 16:
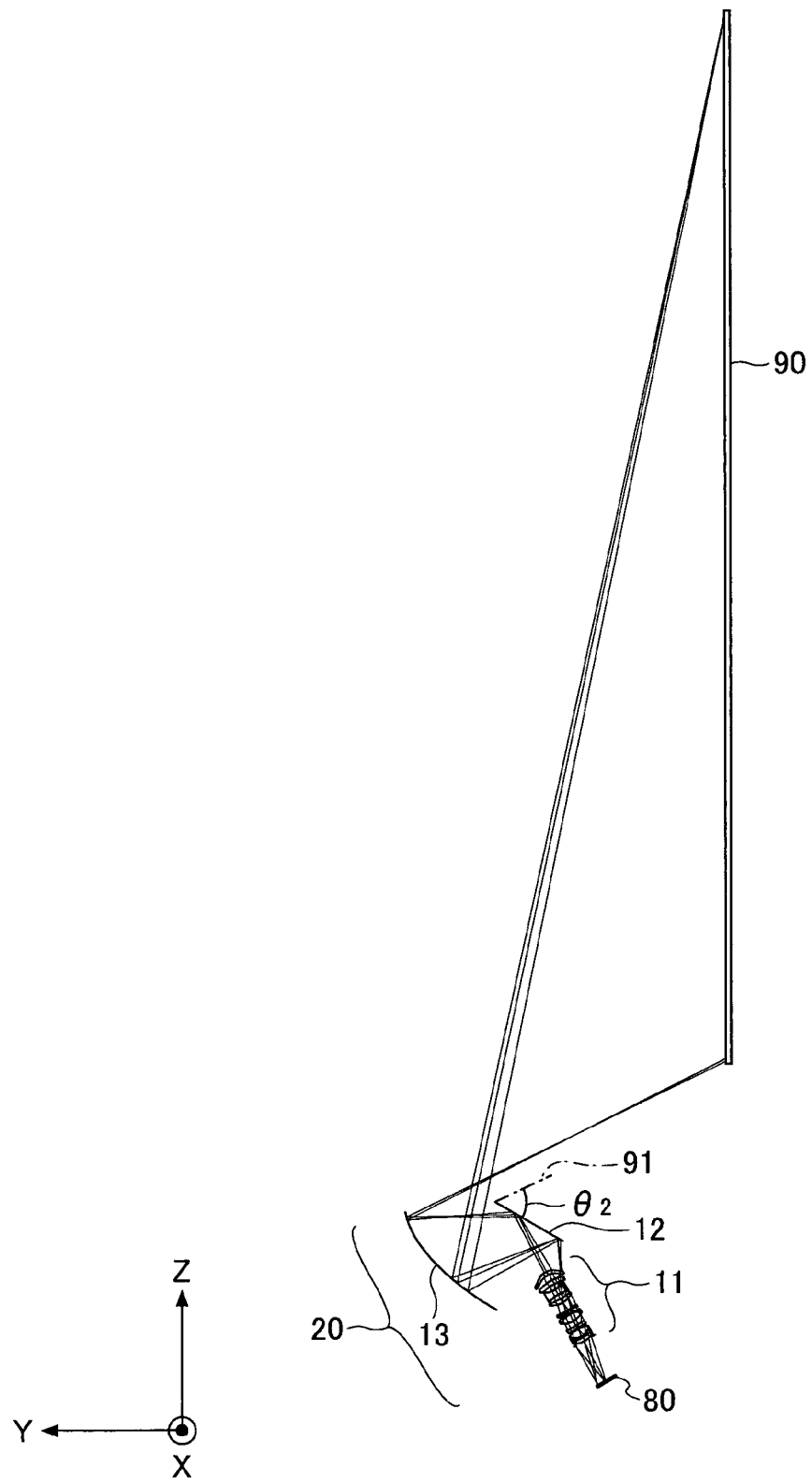
FIG. 16 is a ray diagram illustrating a projection optical system of a third example.

FIG. 16 is a ray diagram illustrating a projection optical system of Example 3. In the coordinate system of FIG. 16, the symbol X denotes the long axis direction of the screen, the symbol Z denotes the short axis direction of the screen, and the symbol Y denotes the normal direction of the screen. Referring to FIG. 16, a projection optical system 20 is the same as the projection optical system 10 in Examples 1 and 2 except that the angle of the folding mirror $\theta_2$ is 60° ($\theta_2=60°$).

In Example 3, it is assumed that $d_1=0.77$ and $d_2=0.85$. Further, in Example 3, the parameters and the values thereof in Table 1 are used. Namely, similar to Example 1, it is assumed that $l_2=148$ mm. As doing like this, by adjusting the angle of folding mirror, it may become possible to achieve the folding structure easily without changing the distance $l_2$. However, when doing like this, as illustrated in FIG. 16, the first optical system 11 may be tilted relative to the Z axis, and as a result, the size of the optical system in the Y axis direction may be increased. Therefore, it may be necessary to determine the angle $\theta_2$ within a range where the relationship "$45° \le \theta_2 \le 60°$" is satisfied. Preferably, the angle $\theta_2$ is closer to 45°.

According to the values of $d_1$ and $d_2$ and the values in Table 1, it is obtained that $d_2/d_1=1.1$, $l_2/f=6.3$, and $\theta_2=60°$, any of which satisfies the relationships (conditions) "$0.43 \le d_1$, $0.43 \le d_2$, and $0.7 \le d_2/d_1 \le 2.0$, $6.3 \le l_2/f \le 9.0$, and $45° \theta_2 \le 60°$" described in the first embodiment.

Second Embodiment

In the second embodiment of the present invention, an image projection device is described that includes the projection optical system according to the first embodiment of the present invention. In the second embodiment, the descriptions of the elements, the same as those in the first embodiment are omitted.

Figure 17:
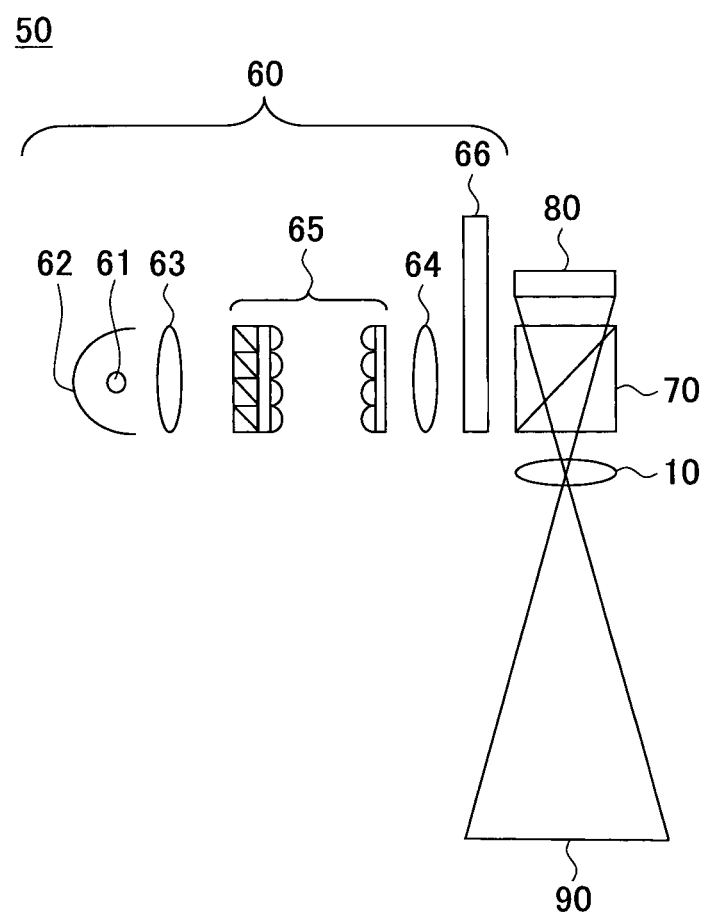
FIG. 17 is a schematic drawing illustrating an image projection device according to a second embodiment of the present invention.

FIG. 17 schematically illustrates an image projection device according to the second embodiment of the present invention. As illustrated in FIG. 17, an image projection device 50 according to the second embodiment of the present invention includes the projection optical system 10 according to the first embodiment of the present invention, a lighting optical system 60, a separating unit 70, and the image forming element 80.

The lighting optical system 60 includes a light source 61, a reflector 62 (which may be integrated with the light source 61) disposed, for example, near the light source 61, relay lenses 63 and 64, and a luminance uniforming unit 65 (which is called an integrator optical system) that unifies light flux reflected by the reflector 62 and having directivity, so that uniform luminance distribution is obtained in the surface of the image forming element 80. As the light source 61, a halogen lamp, a xenon lamp, a metal halide lamp, an extra-high pressure mercury lamp, an LED or the like may be used.

The lighting optical system 60 may further include a color wheel 66 to color the irradiation light, so that with synchronized control of an image of the image forming element 80, color images can be projected. When a reflection-type liquid crystal image forming device is used as the image forming element 80, by using a separating unit 70 separating the illumination light path from the projection light path, it may become possible to improve the efficiency of illumination. On the other hand when a DMD panel is used as the image forming element 80, an optical path separation using a total reflection prism or the like is employed. As described above, an appropriate optical system depending on the type of the image forming element 80 may be employed.

Further, plural image forming devices 80 for, for example, red, green, and blue may be provided so that irradiation light having passed through the color filters are irradiated. Further, composed light composed by a color composing unit may be incident onto the projection light system 10. By doing this, it may become possible to project color images on the screen 90. Further, instead of using the projection optical system 10, the projection optical system 20 may be used.

In the image projection device 50, the image forming device 80 forms images based on the modulation signals. Illumination light from the light source 61 is irradiated onto the image forming device 80, and the images formed on the image forming device 80 are enlarged and projected on the screen 90 by the projection optical system 10.

Although the invention has been described with respect to specific embodiments for a complete and clear disclosure, the appended claims are not to be thus limited but are to be construed as embodying all modifications and alternative constructions that may occur to one skilled in the art that fairly fall within the basic teachings herein set forth.

The present application is based on and claims the benefit of priority of Japanese Patent Application No. 2010-114662, filed on May 18, 2010, the entire contents of which are hereby incorporated herein by reference.

The invention claimed is:

1. A projection optical system projecting images on a surface to be projected on, the projection optical system comprising:

a first optical system including at least one refraction optical system and having positive power as a whole;

a folding mirror; and a second optical system including at least one reflection surface having power and having positive power as a whole;

wherein the folding mirror folds a light path from the first optical system to the second optical system, in a plane including an optical axis of the first optical system and a normal line of the surface to be projected on, wherein, when a projection distance refers to a distance, which is on a line orthogonal to the surface to be projected on, from the surface to be projected on to a position which is inside an area where light is reflected by the second optical system and which is a farthest from the surface to be projected on and a projection size refers to a size in a horizontal direction of an image projected on the surface to be projected on, a ratio of the projection distance to the projection size is less than or equal to 0.23, and wherein the following conditional expressions (1) through (3) are satisfied $$0.43 \leq d_1; \quad (1)$$

$$0.43 \leq d_2; \quad (2)$$

and $$0.7 \leq d_2/d_1 \leq 2.0, \quad (3)$$

further $d_1$ is expressed in the following equation (1)

$$d_1 = \frac{l_1}{f \cos\theta_3} \sin(2\theta_2 - \theta_1 - \theta_3) \quad (1)$$

where a symbol f denotes a focal length of the first optical system;

a symbol $d_1$ denotes a value obtained by dividing a distance by the focal length f of the first optical system, the distance being between a light and a point in a normal direction from the light, the light having been reflected by the folding mirror at a position closest to an outer end closer to the first optical system of outer ends of the folding mirror, the point being the intersection of a surface in the first optical system and the optical axis of the first optical system, the surface being the closest to the light;

a symbol $d_2$ denotes a value obtained by dividing a distance by the focal length f of the first optical system, the distance being in a normal direction from the optical axis of the first optical system and being between a light and an outer end of the folding mirror, the outer end being farther from the first optical system of the outer ends of the folding mirror, the light having been reflected by the second optical system and being closest to the outer end which is farther from the first optical system of the outer ends of the folding mirror;

a symbol $l_1$ denotes a distance in the optical axis of the first optical system and between a surface in the first optical system and the outer end of the folding mirror, the surface being closest to the folding minor, the outer end being closer to the first optical system of the outer ends of the folding mirror;

a symbol $\theta_1$ denotes an emission angle of light relative to the optical axis, the light being reflected by the folding mirror at a position closest to the outer end closer to the first optical system of the outer ends of the folding minor and being emitted from the surface closest to the folding mirror, the surface being included in the first optical system;

a symbol $\theta_2$ denotes an angle of the folding mirror relative to a normal direction of the optical axis; and a symbol $\theta_3$ denotes an angle of a line relative to the optical axis, the line connecting between an outer end and a point, the outer end being closer to the first optical system of the outer ends of the folding mirror, the point being the intersection of the surface in the first optical system and the optical axis of the first optical system, the surface being the closest to the folding mirror.

2. The projection optical system according to claim 1, wherein the following conditional expression (4) is satisfied $$0.43 \leq d_3, \quad (4)$$

further $d_3$ is expressed in the following equation (2)

$$d_3 = \frac{l_1}{f \cos\theta_4} \sin(2\theta_2 - \theta_1 - \theta_4) \quad (2)$$

where a symbol $\theta_4$ denotes an angle of a line relative to the optical axis of the first optical system, the line being a tangent line drawn from an outer end to a point of a surface in the first optical system, the outer end being closer to the first optical system of the outer ends of the folding minor, the surface being closest to the folding mirror; and a symbol $d_3$ denotes a value obtained by dividing a distance by the focal length f of the first optical system, the distance being between light and a point of the surface in the normal direction of the light, the light having been reflected by the folding mirror at a point closest to the outer end closer to the first optical system of the outer ends of the folding mirror, the point being an intersection between the tangent line and the surface of the first optical system, the surface being closest to the folding mirror.

3. The projection optical system according to claim 1, wherein the following conditional expression (5) is satisfied $$6.3 \leq l_2/f \leq 9.0, \quad (5)$$

where
a symbol $l_2$ denotes a distance of light from a surface in the first optical system to the second optical system, the light being reflected by the folding minor at a position closest to an outer end which is farther from the first optical system of the outer ends of the folding mirror, the surface being closest to the folding mirror.

4. The projection optical system according to claim 1, wherein the reflection surface of the second optical system is an adjustable curved surface.

5. The projection optical system according to claim 1, wherein the refraction optical system includes an aspheric-shaped refracting surface.

6. The projection optical system according to claim 1, wherein the folding mirror is a flat mirror.

7. The projection optical system according to claim 1, wherein the first optical system is a coaxial system.

8. The projection optical system according to claim 1, wherein $\theta_2$ is within a range $45° \leq \theta_2 \leq 60°$.

9. An image projection device, wherein irradiation light from a light source is irradiated onto an image forming element where images are formed based on modulation signals, and the images formed on the image forming element are enlarged and projected onto a surface to be projected on using the projection optical system according to claim 1.

* * * * *